United States Patent [19]

Hashimoto et al.

[11] 4,007,410
[45] Feb. 8, 1977

[54] NUMERICAL CONTROL PULSE DISTRIBUTION SYSTEM

[75] Inventors: Yoshihiro Hashimoto, Yokohama; Kengo Kobayashi, Kawasaki, both of Japan

[73] Assignee: Fujitsu Ltd., Kawasaki, Japan

[22] Filed: Sept. 26, 1972

[21] Appl. No.: 291,047

Related U.S. Application Data

[63] Continuation of Ser. No. 113,091, Feb. 5, 1971, abandoned.

[52] U.S. Cl. .............................. 318/571; 318/573
[51] Int. Cl.$^2$ ...................................... G05B 19/24
[58] Field of Search ........................... 318/573, 571

[56] References Cited

UNITED STATES PATENTS

| | | | |
|---|---|---|---|
| 3,416,056 | 12/1968 | Motooka et al. | 318/573 |
| 3,461,365 | 8/1969 | Newland et al. | 318/573 |

Primary Examiner—B. Dobeck
Attorney, Agent, or Firm—Herbert L. Lerner

[57] ABSTRACT

A converter converts numerical data of unit length indicating instructions for moving a component in directions of first and second coordinates to a number of pulses of minor resolution. An interpolator coupled to the converter interpolates the pulses of minor resolution to provide distribution pulses of minor resolution. A mover coupled to the interpolator moves the component in directions of one of the coordinates in minor resolution. A divider coupled to the interpolator converts the number of pulses of minor resolution to the lesser number of pulses of major resolution and a mover coupled to the divider moves the component in directions of the other of the coordinates in major resolution.

4 Claims, 39 Drawing Figures

FIG. 9
|    | U | 3 | 5 | 7 | 5 | V | 1 | 2 | 3 | 0 | X | 1 | 2 | 3 | 0 | Z | 3 | 5 | 7 | 5 | AC | CR |
|----|---|---|---|---|---|---|---|---|---|---|---|---|---|---|---|---|---|---|---|---|----|----|
| h1 | o | o | o | o | o |   | o |   |   | o |   | o |   |   | o |   | o | o | o |   | o  | o  |
| h2 |   | o |   | o |   |   |   | o | o |   |   | o | o |   |   |   | o |   | o |   |    |    |
| h3 | o |   | o | o | o | o |   |   |   | o |   |   |   | o |   |   |   | o | o | o |    |    |
| h  | o | o | o | o | o | o | o | o | o | o | o | o | o | o | o | o | o | o | o | o | o  | o  |
| h4 |   |   |   |   |   |   |   |   |   |   |   |   |   |   |   |   |   | o |   |   |    |    |
| h5 | o | o |   | o |   |   |   | o | o |   |   | o | o |   |   |   | o | o | o |   | o  |    |
| h6 | o |   |   |   |   |   | o |   |   |   | o | o |   |   |   |   | o |   |   |   |    | o  |
| h7 |   |   |   |   |   |   |   |   |   |   |   |   |   |   |   |   |   |   |   |   |    | o  |
| h8 |   |   |   |   |   |   |   |   |   |   |   |   |   |   |   |   |   |   |   |   |    | o  |
TAPE 10
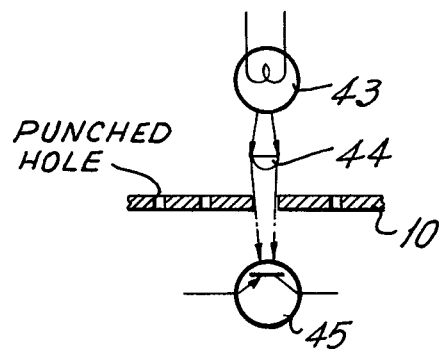
FIG. 10
PUNCHED HOLE
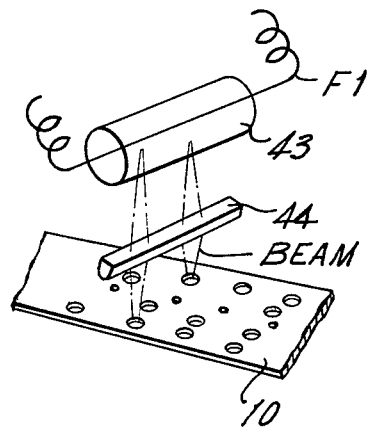
FIG. 11

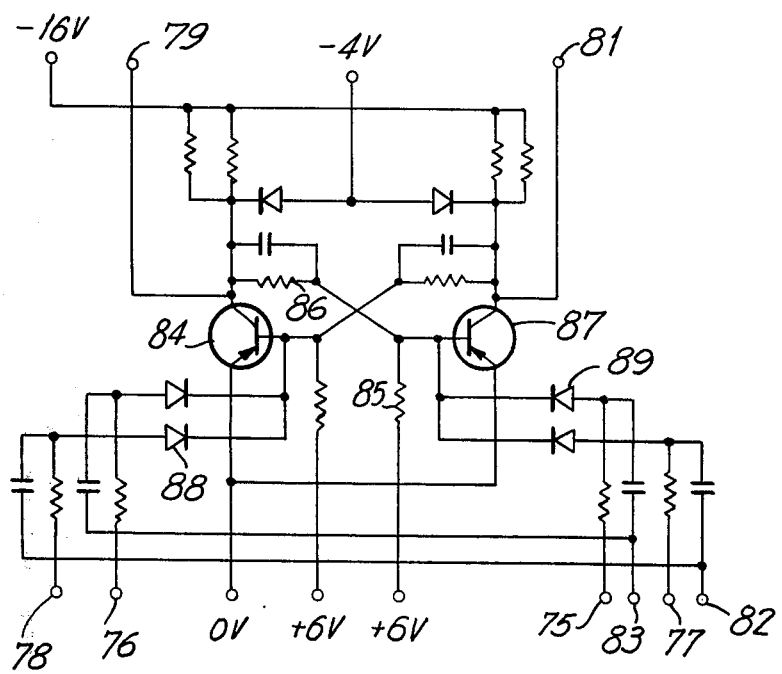
FIG.18

| NUMBERS | SIGNALS | | | | STORAGE UNITS OF N REGISTER | | | | | | | |
|---|---|---|---|---|---|---|---|---|---|---|---|---|
| | S4 | S3 | S2 | S1 | 72H | 72G | 72F | 72E | 72D | 72C | 72B | 72A |
| 1 | 0 | 0 | 0 | 1 | 0 | 0 | 1 | 0 | 0 | 0 | 0 | 0 |
| 2 | 0 | 0 | 1 | 0 | 0 | 1 | 0 | 0 | 0 | 0 | 0 | 0 |
| 3 | 0 | 0 | 1 | 1 | 0 | 1 | 1 | 0 | 0 | 0 | 0 | 0 |
| 4 | 0 | 1 | 0 | 0 | 1 | 0 | 0 | 0 | 0 | 0 | 0 | 0 |
| 5 | 0 | 1 | 0 | 1 | 0 | 0 | 0 | 0 | 0 | 0 | 0 | 1 |
| 6 | 0 | 1 | 1 | 0 | 0 | 0 | 1 | 0 | 0 | 0 | 0 | 1 |
| 7 | 0 | 1 | 1 | 1 | 0 | 1 | 0 | 0 | 0 | 0 | 0 | 1 |
| 8 | 1 | 0 | 0 | 0 | 0 | 1 | 1 | 0 | 0 | 0 | 0 | 1 |
| 9 | 1 | 0 | 0 | 1 | 1 | 0 | 0 | 0 | 0 | 0 | 0 | 1 |
| 0 | 0 | 0 | 0 | 0 | 0 | 0 | 0 | 0 | 0 | 0 | 0 | 0 |

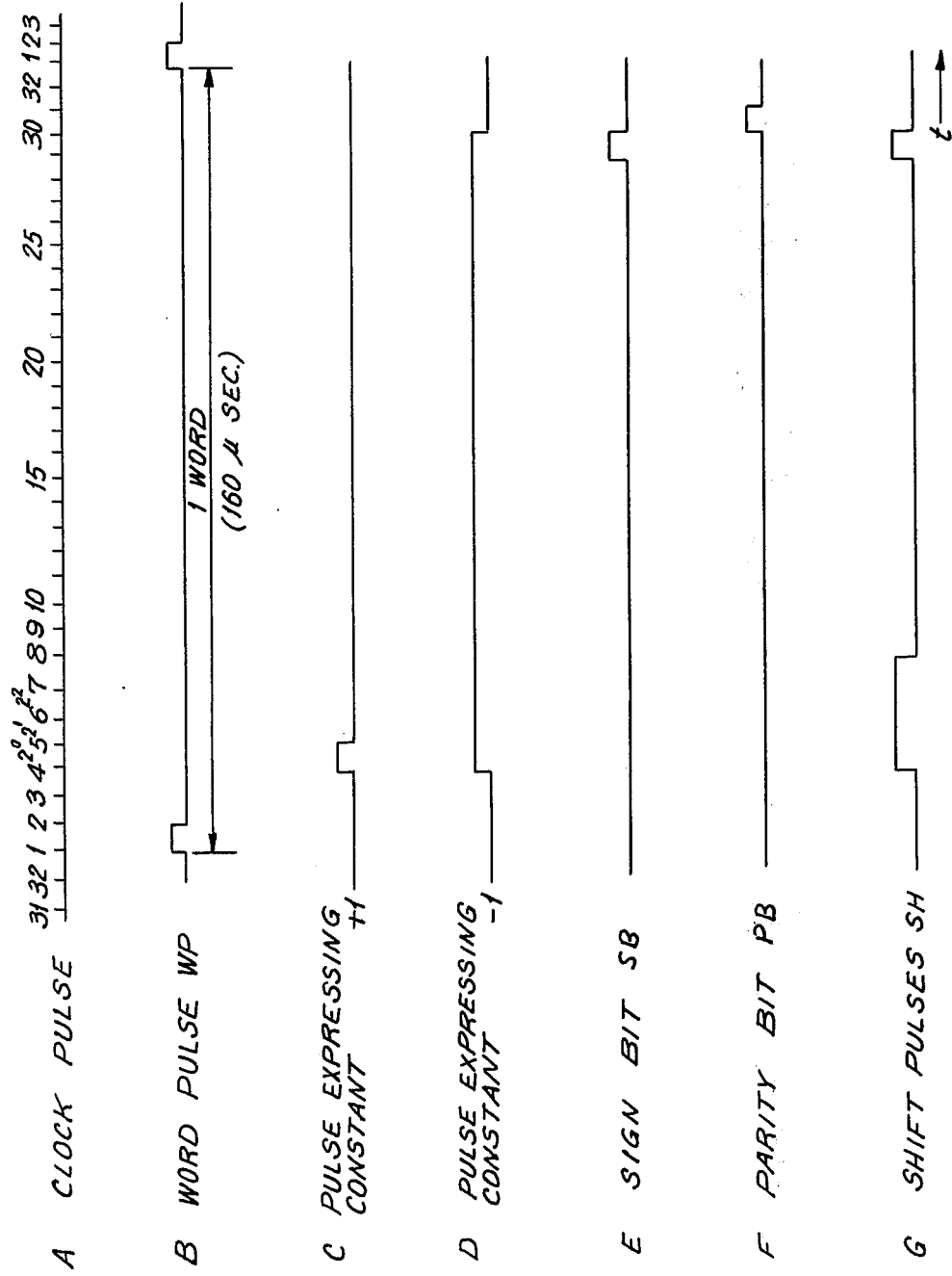

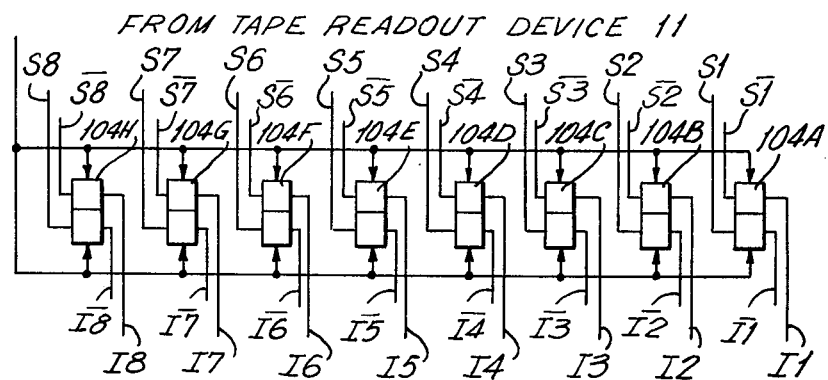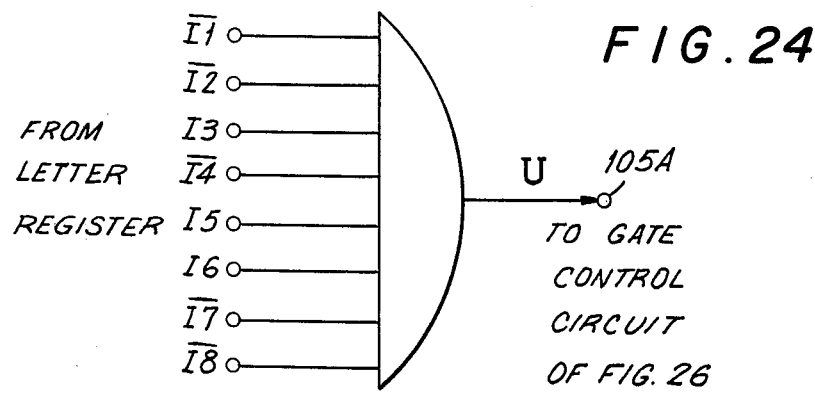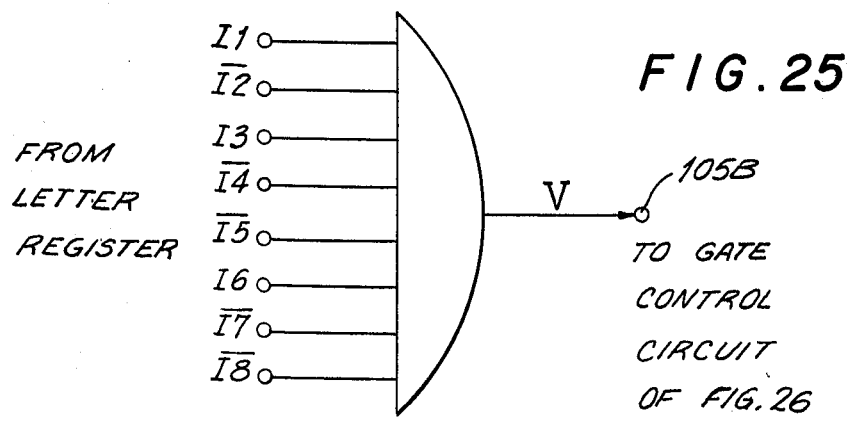

FIG. 27

|      | 116A | 116B | 116C | 116D | 116E | 116F | 116G | 116H |
|------|------|------|------|------|------|------|------|------|
| 94A  | 0    | 0    |      |      |      |      |      |      |
| 94B  |      |      | 0    | 0    |      |      |      |      |
| 94C  |      |      |      |      | 0    | 0    |      |      |
| 94D  |      |      |      |      |      |      | 0    | 0    |
| 106A |      |      |      |      |      |      |      |      |
| 106B |      |      |      |      |      |      |      |      |
| 106C |      |      |      |      |      |      |      |      |
| 106D |      |      |      |      |      |      |      |      |
| 106E |      |      |      |      |      |      |      |      |
| 96A  | 0    | 0    |      |      |      |      |      |      |
| 96B  |      |      | 0    | 0    |      |      |      |      |
| 96C  |      |      |      |      | 0    | 0    |      |      |
| 96D  |      |      |      |      |      |      | 0    | 0    |
| 96E  |      |      |      |      |      |      |      |      |
| 95A  |      | 0    |      | 0    |      | 0    |      | 0    |
| 95B  | 0    |      | 0    |      | 0    |      | 0    |      |
| 95C  |      |      |      |      |      |      |      |      |
| 95D  | 0    | 0    | 0    | 0    | 0    | 0    | 0    | 0    |
| 95E  | 0    |      | 0    |      | 0    |      | 0    |      |
| 95F  |      |      |      |      |      |      |      |      |
| 95G  |      |      |      |      |      |      |      |      |
| 107A & 107B |  | 0 |   | 0    |      | 0    |      | 0    |

| 116 A | (93A) × 10 (1010 BINARY) → 93A |
|-------|--------------------------------|
| 116 B | (93A) + OUTPUT IN FIG. 16 → 93A |
| 116 C | (93B) × 10 → 93B |
| 116 D | (93B) + OUTPUT IN FIG. 16 → 93B |
| 116 E | (93C) × 10 → 93C |
| 116 F | (93C) + OUTPUT IN FIG. 16 → 93C |
| 116 G | (93D) × 10 → 93D |
| 116 H | (93D) + OUTPUT IN FIG. 16 → 93D |

| | 94A | 94B | 94C | 94D | 106A | 106B | 106C | 106D | 106E | 96A | 96B | 96C | 96D | 96E | 95A | 95B | 95C | 95D | 95E | 95F | 95G | 107A | 107B |
|---|---|---|---|---|---|---|---|---|---|---|---|---|---|---|---|---|---|---|---|---|---|---|---|
| 134A (93E)−(93D)→93E | | | O | | | | | | | | | | | | O | | O | | | | O | | |
| 134B (93A)+1→93A | O | | | | | | | | | | | | | | O | | | | | | | | |
| 134C (93A)−(93C) | | | O | | O | | | | | | | | | | O | | O | O | | | | | |
| 148A (93E)+(93C)→93E | | | O | O | | | | | | | | | | O | O | | | O | | | O | | |
| 148B (93B)+1→93B | | O | | | | | | | | | | | | | O | | | | | | | | |
| 148C (93B)−(93D) | | | | O | | O | | | | | | | | | O | | O | | | | | | |
| 165A (93E)−2(93A)+1→93E | O | | | | | | | | | O | | | | O | O | | O | | | | O | | |
| 165B (93A)−1→93A | O | | | | | | | | | | | | | | O | | | | | | | | |
| 165C (93C)−(93A) | O | | | | | | O | | | | | | | | | | | | | | | | |
| 168A (93E)+2(93B)+1→93E | | O | | | | | | | | | O | | | | O | O | | O | | | O | | |
| 168B (93B)+1→93B | | O | | | | | | | | | | | | | O | | | O | | | O | | |
| 168C (93B)−(93D) | | | | O | | O | | | | | | O | | | O | | O | | | | | | |

STRAIGHT LINE

| | DISCRIMINANT $D \geq 0$ | DISCRIMINANT $D < 0$ |
|---|---|---|
| 0 | 1. $(\pm')$ ⟶ $(\pm)$ (FIG. 31)<br>2. A FEED PULSE ⟶ 127X (FIG.31) | 1. $(\pm')$ ⟶ $(\pm)$ (FIG. 31)<br>2. A FEED PULSE ⟶ 127Z (FIG.31) |
| 1 | 1. (93E)-(93D) ⟶ (93E) (FIG. 21)<br>2. DETECTED D ⟶ $(\pm')$ (FIG. 31) | 1. (93E)+(93C) ⟶ (93E) (FIG. 21)<br>2. D ⟶ $(\pm')$ (FIG. 31) |
| 2 | (93A)+1 ⟶ (93A) (FIG. 21) | (93B)+1 ⟶ (93B) (FIG. 21) |
| 3 | (93A)-(93C) ⟶ (144) (FIG. 31) | (93B)-(93D) ⟶ (154) (FIG.31) |

FIG.33

ARC

| | DISCRIMINANT $D \geq 0$ | DISCRIMINANT $D < 0$ |
|---|---|---|
| 0 | 1. $(\pm')$ ⟶ $(\pm)$<br>2. A FEED PULSE ⟶ 127X | 1. $(\pm')$ ⟶ $(\pm)$<br>2. A FEED PULSE ⟶ 127Z |
| 1 | 1. (93E)-2(93A)+1 ⟶ (93E)<br>2. D ⟶ $(\pm)$ | 1. (93E)+2(93B)+1 ⟶ (93E)<br>2. D ⟶ $(\pm')$ |
| 2 | (93A)-1 ⟶ (93A) | (93B)+1 ⟶ (93B) |
| 3 | (93C)-(93A) ⟶ (144) | (93B)-(93D) ⟶ (154) |

FIG.34

FIG. 38
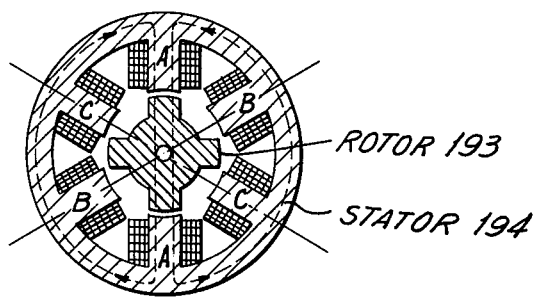
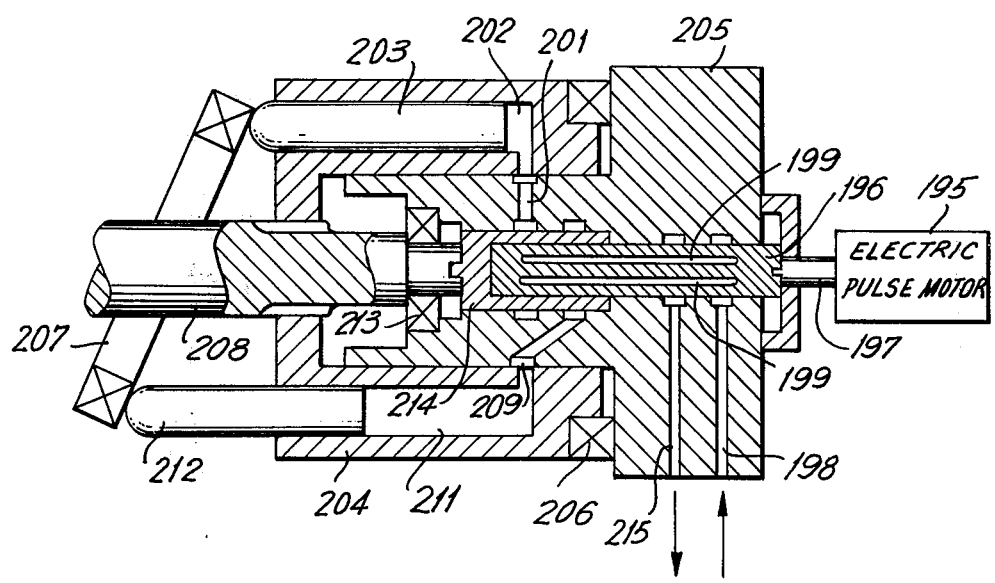
FIG. 39

NUMERICAL CONTROL PULSE DISTRIBUTION SYSTEM

This is a continuation of application Ser. No. 113,091, filed Feb. 5, 1971, now abandoned.

DESCRIPTION OF THE INVENTION:

The present invention relates to a numerical control pulse distribution system. More particularly, the invention relates to a numerical control pulse distribution system for moving a component such as, for example, a machine tool, in directions of first and second Cartesian coordinates.

In a numerical control pulse distribution system for continuously controlling the movement of a machine tool, said tool is generally moved in directions of each coordinate by a corresponding pulse driven motor. The coordinates are generally at right angles to each other. Either the actual tool such as, for example, a cutting tool, or a support for the workpiece such as, for example, a table, is moved along the different coordinates. In a pulse distribution system of this type, the distance by which the tool or workpiece is moved in accordance with each pulse is of considerable importance. The distance of movement of the component such as, for example, the machine tool or workpiece, for each pulse is defined as the resolution. The resolution is thus determined by the speed of movement of the component and the precision of the operation performed by or on such component. Generally, the precision of operation on the workpiece may be considerably improved by making the resolution smaller. Since the pulse frequency response of the driving motors is limited, however, the maximum speed of movement of the component is limited.

In many instances, therefore, the resolution is set at 0.01 mm and the resolution along each of the coordinates or axes is equal. Thus, the component is moved at a resolution of 0.01 mm per pulse in each of the coordinates or axes. In certain types of machine operations, however, it is desirable to have different resolutions in the directions of different coordinates. Thus, for example, in operating an engine lathe, the resolution in the direction of the coordinate which corresponds to the radius of the workpiece, which is the X axis, is preferably small. The resolution in the X axis direction is preferably small so that the precision of the machine operation may be enhanced, and the smaller resolution may be, for example, 0.005 mm per pulse. The precision required in the machine operation in the directions of the second coordinate such as, for example, the Z axis, is not as great as that required in the X axis, so that the resolution in the Z axis may be 0.01 mm per pulse, for example.

The principal object of the present invention is to provide a new and improved numerical control pulse distribution system.

An object of the present invention is to provide a numerical control pulse distribution system of simple structure which provides different resolutions in different coordinates.

An object of the present invention is to provide a numerical control pulse distribution system which provides different resolutions in different coordinates with efficiency, effectiveness and reliability.

Another object of the present invention is to provide a numerical control pulse distribution system which involves very slight modification of a conventional pulse distribution system to provide different resolutions in different coordinates.

In accordance with the present invention, a numerical control pulse distribution system for moving a component in directions of first and second coordinates comprises a source of instructions for moving the component in directions of both coordinates with numerical data indicated by unit length. A converter connected to the source of instructions converts the numerical data to a number of pulses of minor resolution. An interpolator coupled to the converter interpolates the pulses of minor resolution to provide distribution pulses of minor resolution. A mover coupled to the interpolator moves the component in directions of one of the coordinates in minor resolution. A divider coupled to the interpolator reconverts the number of pulses of minor resolution to the lesser number of pulses of major resolution. A mover coupled to the divider moves the component in directions of the other of the coordinates in major resolution.

In accordance with the present invention, a numerical control pulse distribution system for a control system in which a component coupled to a pair of motors is moved in a pattern by the motors, the component being moved in directions of a first coordinate in accordance with pulses supplied to one of the motors and in directions of a second coordinate in accordance with pulses supplied to the other of the motors, comprises a source of control data indicating the pattern in which the component is to be moved. An input data converter coupled to the source of control data converts the control data into a number of pulses which is a multiple of the number of pulses corresponding to the control data. A storage connected to the input data converter stores the pulses provided by the input data converter. An interpolator connected to the storage interpolates the pulses stored in the storage to provide distribution pulses corresponding to the number of pulses stored in the storage. A first drive connected to the interpolator drives a first of the pair of motors. A second drive connected to the interpolator drives a second of the pair of motors. A pulse divider interposed in the connection of one of the first and second drivers and the interpolator divides the number of pulses by the multiple thereby supplying a number of distribution pulses to the corresponding one of the motors which corresponds to the control data, whereas the multiple of the number of distribution pulses is supplied to the other of the motors.

In the foregoing system, the number of pulses of minor resolution is twice that of major resolution. The multiple is 2 and the coordinates are at right angles to each other.

In accordance with the present invention, a method of numerical control pulse distribution for moving a component in directions of first and second coordinates comprises providing instructions for moving the component in directions of both coordinates with numerical data indicated by unit length. A number of distribution pulses of minor resolution are derived from the instructions. The component is moved in directions of one of the coordinates in accordance with the minor resolution. The number of distrubution pulses of minor resolution are divided back to a number of distribution pulses of major resolution. The component is moved in directions of the other of the coordinates in accordance with the major resolution.

In accordance with the present invention, a method of numerical control pulse distribution for moving a component in directions of first and second coordinates comprises providing instructions for moving the component in directions of both coordinates with numerical data indicated by unit length. A number of distribution pulses which is a multiple of the numerical data of the instructions for moving the component in directions of both coordinates are derived from the instructions. The component is moved in directions of one of the coordinates in accordance with the number of distribution pulses. The number of distribution pulses is divided by the multiple and the component is moved in directions of the other of the coordinates in accordance with the number of pulses in the instructions.

In order that the present invention may be readily carried into effect, it will now be described with reference to the accompanying drawings, wherein:

FIG. 9 is a schematic diagram of an instruction tape which may be utilized in the pulse distribution system of the present invention;

FIG. 10 is a view, partly in section, of tape readout apparatus which may be utilized in the pulse distribution system of the present invention;

FIG. 11 is a perspective view of the tape readout apparatus of FIG. 10;

FIG. 18 is a circuit diagram of an embodiment of a dual input flip flop which may be utilized in the N register of FIG. 16;

FIG. 22 is a graphical presentation illustrating the waveforms of various signals appearing in the interpolator of FIG. 21;

FIG. 23 is a block diagram of a letter register which may be utilized in the pulse distribution system of the present invention;

FIG. 24 is a block diagram of a decoder for a letter which may be utilized in the pulse distribution system of the present invention;

FIG. 25 is a block diagram of a decoder for another letter which may be utilized in the pulse distribution system of the present invention;

FIG. 27 is a tabular presentation of the operation of gates by the gate control circuit of FIG. 26;

FIG. 28 is a tabular presentation of the operations of the interpolator of FIG. 21;

FIG. 32 is a tabular presentation illustrating the operation of the gates of the interpolator of FIG. 21 by the gate control circuit of FIG. 32;

FIG. 33 is a graphical presentation illustrating linear interpolation;

FIG. 34 is a graphical presentation illustrating arcuate interpolation;

FIG. 38 is a sectional view of an electric pulse motor which may be utilized in the pulse distribution system of the present invention; and FIG. 39 is a sectional view of an electrohydraulic pulse motor which may be utilized in the pulse distribution system of the present invention.

In the figures, the same components are identified by the same reference numerals.

Figure 1:
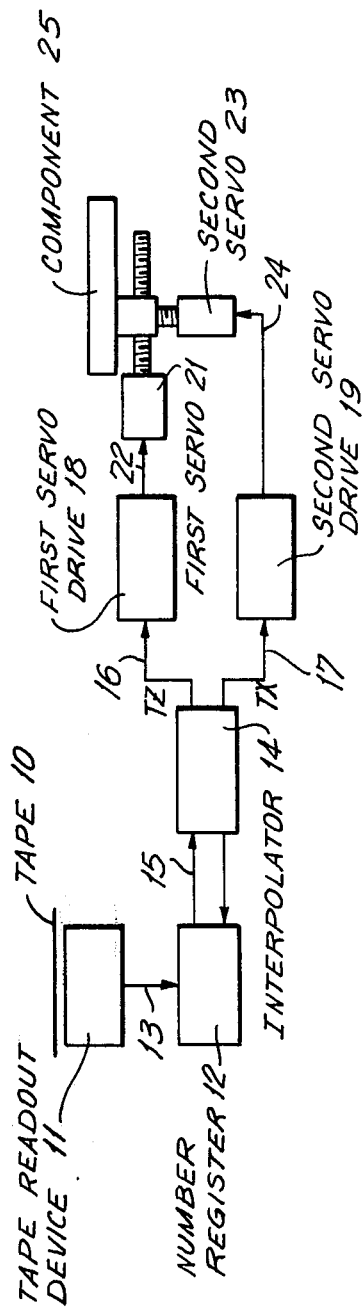
FIG. 1 is a block diagram of an embodiment of a conventional numerical control pulse distribution system.

In FIG. 1, a tape readout device 11 has an output connected to the input of a number register 12 via a lead 13. The number register 12 has an output connected to the input of an interpolator 14 via a lead 15. Each of the tape readout device, the number register 12 and the interpolator 14 comprises apparatus which is well known in the art. The interpolator 14 may thus comprise, for example, an algebraic operation system of known type and functions to produce the necessary distribution pulses at its outputs. The outputs of the interpolator 14 are connected to leads 16 and 17, respectively, and provide pulses TZ and TX, respectively. The distributed pulses in the leads 16 and 17 correspond to numerical data or instructions recorded in a tape 10 which is positioned in operative proximity with the tape readout device 11.

The distributed pulses TZ provided by the interpolator 14 are supplied to the input of a first servo drive 18, which functions in the present illustration as the Z axis drive. The distributed pulses TX in the lead 17 are supplied to the input of a second servo drive 19, which in the present example operates as the X axis servo drive. The first servo drive 18 is connected to a first servo or motor 21 via a lead 22. The second servo drive 19 is connected to a second servo or motor 23 via a lead 24. The first and second servos 21 and 23 thus function as the Z and X axis servos. A component 25, which may comprise either a workpiece or a machine or tool, is mechanically coupled to the first and second servos 21 and 23 and is moved by said servos in directions of the Z and X coordinates or axes, respectively.

Figure 2:
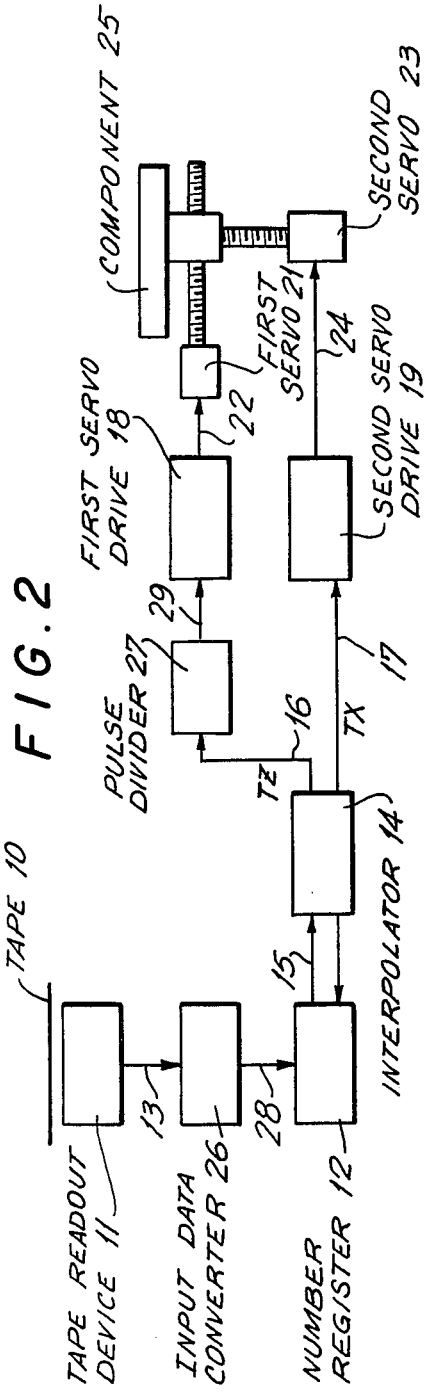
FIG. 2 is a block diagram of an embodiment of the numerical control pulse distribution system of the present invention.

FIG. 2 illustrates the numerical control pulse distribution system of the present invention. The system of FIG. 2 is similar to that of the prior art shown in FIG. 1. The difference between the system of the present invention, as shown in FIG. 2, and the system of the prior art, as shown in FIG. 1, is the addition in FIG. 2 of an input data converter 26 and a pulse divider 27. The input data converter 26 has an input connected to the output of the tape readout device 11 via the lead 13 and an output connected to the input of the number register 12 via a lead 28. The input data converter 26 functions to convert a number of pulses read out from the tape 10 by the tape readout device 11 to a greater number of pulses. The pulse divider 27 has an input connected to the output of the interpolator 14 via the lead 16 and an output connected to the input of the first servo drive 18 via a lead 29. The pulse divider 27 functions to reconvert the number of pulses provided by the input data converter 26 to the initial number of pulses supplied by the tape readout device 11. With the exception of the input data converter 26 and the pulse divider 27, the systems of FIGS. 1 and 2 are identical.

In each of FIGS. 1 and 2, the first and second servo drives 18 and 19, respectively, and the first and second servos 21 and 23, respectively, are devices which are well known in the art and which are utilized in any system similar to that of the present invention. In operation, the system of the prior art (FIG. 1) provides equal resolution in both the X and Z axes. The tape readout device 11 reads out the numerical instructions for moving the component 25 in directions of both the X and Z axes or coordinates, as such instructions are recorded in the tape 10. The tape readout device 11 supplies the number of pulses corresponding to the recorded instructions to the number register 12. The number register 12 records such number of pulses and supplies the stored pulses to the interpolator 14 which provides distribution pulses in accordance with such number of pulses.

Figure 3:
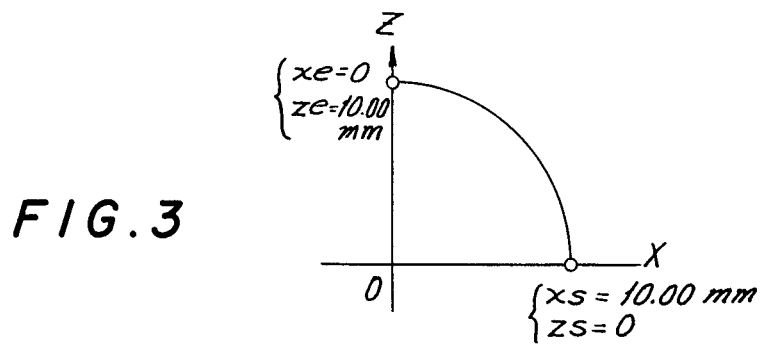
FIG. 3 is a graphical presentation of a curve which may be interpolated by the pulse distribution system of the present invention.

Each distribution pulse supplied by the interpolator 14 to each of the first sevo drive 18 and the second servo drive 19 via the leads 16 and 17, respectively, represents an equal distance of movement of the component 25. The component 25 is thus moved in directions of each of the X and Z coordinates with the same resolution. Table I tabulates the operation of the known system in the first two columns of data on the left. The resolution is thus 0.01 mm per pulse in the directions of each of the X and Z axes or coordinates. Thus, in order to interpolate an arc, as shown in FIG. 3, numerical data representing the start point $xs = 10.00$ mm, $zs = 0$, and the end point $xe = 0$ and $ze = 10.00$ mm, is supplied by the tape readout device 11 in accordance with the instructions recorded in the tape 10. The numerical data is then stored in the number register 12 and the interpolator 14 derives the distribution pulses from the stored numerical data.

In the operation of the system of the present invention, as shown in FIG. 2, the instructions recorded in the tape 10 indicate the pattern in which the component 25 is to be moved by the first and second servos or motors 21 and 23. The component 25 is moved in directions of the Z axis in accordance with the pulses supplied to the first servo or motor 21 and in directions of the X axis or coordinate in accordance with pulses supplied to the second servo or motor 23. The tape readout device 11 reads out the instructions recorded in the tape 10 and supplies a number of pulses corresponding thereto to the input data converter 26. The number of pulses supplied by the tape readout device 11 corresponds to a major resolution, each pulse representing a movement of the component 25 of 0.01 mm. The input data converter 26 converts the control data supplied by the output readout device into a number of pulses which is a multiple of the number of pulses corresponding to the control data. The input data converter 26 thus provides, for example, twice the number of pulses as those supplied to it. It therefore converts the pulses representing the major resolution to a number of pulses representing a minor resolution of 0.005 mm per pulse. This is due to the fact that twice the number of pulses is provided per unit of time.

The number of pulses of minor resolution are supplied by the input data converter 26 to the number register 12 where they are stored. The number register 12 supplies the pulses of minor resolution to the interpolator 14. The interpolator 14 interpolates the pulses of minor resolution to provide distribution pulses of minor resolution. That is, the interpolator 14 provides distribution pulses corresponding to the number of pulses stored in the number register 12 and supplied to said interpolator. The distribution pulses provided by the interpolator 14 are supplied directly to the second servo system via the lead 17 to provide movement of the component 25 in directions of the X axis in minor resolution, at 0.005 mm per pulse.

The distribution pulses provided by the interpolator 14 are also supplied to the pulse divider 27 via the lead 16. The pulse divider 27 divides the number of distribution pulses by the multiple by which the input data converter 26 increases the number of pulses, so that said pulse divider divides the number of pulses supplied to it in half. The pulse divider 27 thus provides a number of distribution pulses which corresponds to the number of pulses of the control data recorded in the tape 10. In other words, the divider 27 reconverts the number of pulses of minor resolution to the lesser number of pulses of major resolution. The first servo system is thus provided with distribution pulses of major resolution, at 0.01 mm per pulse and moves the component 25 in accordance with said major resolution in directions of the Z axis or coordinate.

The operation of the known system and the system of the present invention are compared in tabular form in Table I.

Table I

|  | Known System | | System of the Present Invention | |
| --- | --- | --- | --- | --- |
|  | X Axis | Z Axis | X Axis | Z Axis |
| Input Data (numerical value) | 1000 | 1000 | 1000 | 1000 |
| Input Data Converter (function) |  |  | 2 times | 2 times |
| Number Register (numerical value) | 1000 | 1000 | 2000 | 2000 |
| Distribution Pulse Output of the Interpolator (number of pulses) | 1000 | 1000 | 2000 | 2000 |
| Pulse Divider (function) |  |  |  | 1/2 times |
| Output Pulses for Moving the Component (number of pulses) | 1000 | 1000 | 2000 | 1000 |
| Distance of Movement of the Component (mm) | 10.00 | 10.00 | 10.00 | 10.00 |

Figure 4:
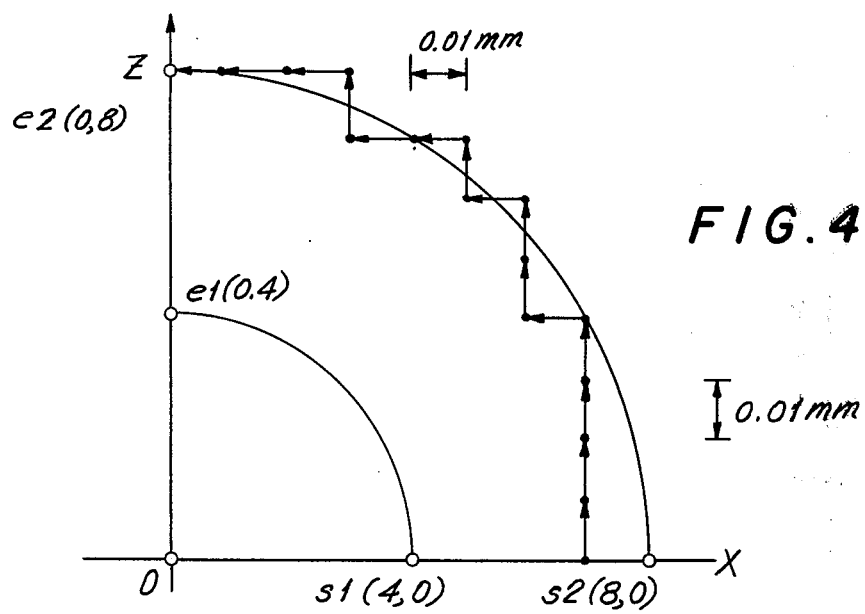
FIG. 4 is a graphical presentation illustrating interpolation in the pulse distribution system of the present invention.
Figure 5:
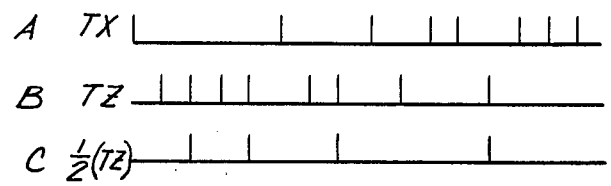
FIG. 5 is a graphical presentation of pulse trains occurring at various points in the system of FIG. 2.
Figure 6:
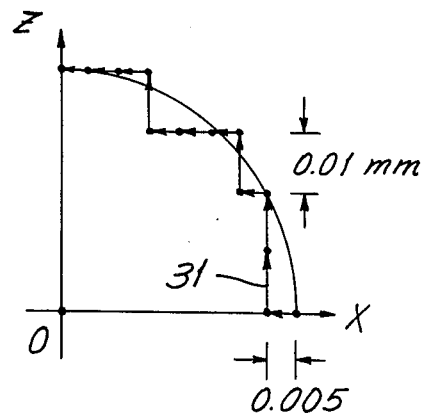
FIG. 6 is a graphical presentation illustrating the movement of the component under the control of the pulse distribution system of the present invention.

The operation of the system of the present invention is illustrated in FIGS. 4, 5 and 6. In order to maintain simplicity of illustration, it is assumed that the start point s1 of the curve of FIG. 4, which the machine is to follow, has the coordinates 4,0 and the end point e1 has the coordinates 0,4. The curve to be followed is an arc having its center at the origin. In accordance with the present invention, the X axis resolution is 0.005 mm per pulse and the Z axis resolution is 0.01 mm per pulse. Since the Z axis resolution is twice as great as the X axis resolution, the numerical data representing the start point and the end point, as recorded in the tape 10 (FIG. 2), is doubled by the input data converter 26 of FIG. 2. Thus, the major resolution of 0.01 mm per pulse of the instructions is converted into the minor resolution of 0.005 mm per pulse and the doubled number of pulses is recorded or stored in the number register 12 (FIG. 2). The interpolator 14 of FIG. 2 thus provides distribution pulses based on an arc, as shown in FIG. 4, having a start point s2 which has the coordinates 8,0 and an end point which has the coordinates 0,8. If the interpolator 14 comprises an algebraic operative system, as aforementiond, it supplies output pulses TX and TZ, as shown in curves A and B of FIG. 5, via the leads 17 and 16, respectively.

Since the pulse divider 27 of FIG. 2 divides the number of distribution pulses supplied to it in half, the number of pulses of major resolution, supplied to the first servo system is that indicated in curve C of FIG. 5. The servo system for the X axis is thus driven by the pulse train of curve A of FIG. 5 and the servo system of the Z axis is driven by those of curve C of FIG. 5. The machine, machine tool or workpiece is thus moved in increments 31, as shown in FIG. 6. The machine tool or machine may then be moved along a desired arc, as indicated in FIG. 6. The principle of the present invention may be readily applied to a system of different or varied resolution, pulse distribution method, or servo drive arrangement.

Figure 7:
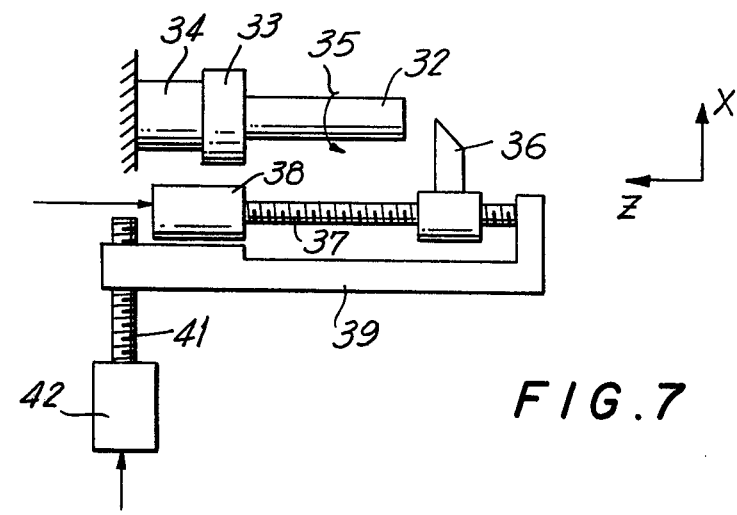
FIG. 7 is a schematic view of parts of an engine lathe which may utilize the pulse distribution system of the present invention.

If the component or machine tool 25 is an engine lathe, a workpiece 32, as shown in FIG. 7, is held by a chuck 33 which is driven by a motor 34 about its axis, as shown by an arrow 35. A cutting tool 36 is moved by a feed screw 37 in directions along the axis of the feed screw, which is the Z axis, by a pulse motor 38 which rotates said feed screw and thereby moves said cutting tool. A carriage 39 supports the feed screw 37 for movement at right angles to the axis of said feed screw which is in directions of the X axis. The carriage 39 is moved in directions of the X axis by a second feed screw 41 which is rotated by a pulse motor 42. Operation or rotation of the motors 38 and 42 thus moves the cutting tool 36 in directions of the Z and X axes and enables the desired operation to be performed on the workpiece 32.

Each of the motors 38 and 42 is driven by pulses and each of said motors is rotated a constant angle, increment or step for each pulse. If the pitch of the first feed screw 37 is different from the pitch of the second feed screw 41, it is possible to provide a minor resolution via one of said feed screws and a major resolution via the other. Thus, for example, the cutting tool 36 may be moved at a resolution of 0.005 mm per pulse in directions of the X axis, each time a pulse is supplied to the motor 42, and said cutting tool may be moved at a resolution of 0.01 mm per pulse in directions of the Z axis, each time a pulse is supplied to the motor 38.

Figure 8:
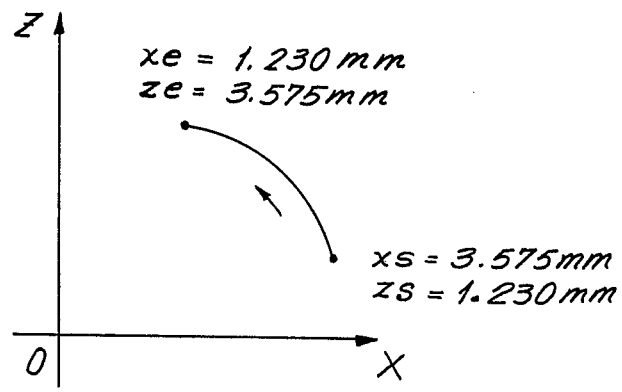
FIG. 8 is a graphical presentation of a curve which may be interpolated by the pulse distribution system of the present invention.

FIG. 8 illustrates an arcuate section which is to be cut by the cutting tool 36 of FIG. 7. The center of the arc of FIG. 8 is at the origin. The coordinates xs, zs of the start point and the coordinates xe, ze of the end point have the following values when 0.001 mm is the unit length.

$xs = 3575$
$zs = 1230$
$xe = 1230$
$ze = 3575$

The foregoing numbers represent the numerical data recorded as the input data or instructions in the tape 10 (FIG. 2). Such data may be recorded by being punched in a tape or by being magnetically recorded. The data, in the system of the present invention, is preferably recorded in the tape 10 as follows:

U 3575 V 1230 X 1230 Z 3575 A wherein U indicates the X coordinate of the start point, V indicates the Z coordinate of the start point, X indicates the X coordinate of the end point, Z indicates the Z coordinate of the end point, and A indicates an arcuate pattern.

FIG. 9 is a schematic diagram of a punched tape which may be utilized as the tape 10 of FIG. 2 and which has recorded therein the foregoing instructions or input data, as indicated in FIG. 9. As illustrated in FIG. 9, the input data or numbers are recorded in binary code and are represented as binary code decimal numbers. In FIG. 9, the smaller diameter holes h are sprocket or tape-feed holes and the code instructions are provided in perforations of larger diameter in eight channels h1 to h8, each code indication extending in a transverse line of the tape 10.

FIGS. 10 and 11 are schematic diagrams of tape readout apparatus which may be utilized as the tape readout device 11 of FIG. 2. In FIGS. 10 and 11, a lamp 43 produces light which is radiated therefrom. The light passes through a lens 44, which focuses it into light beams which pass through the holes formed through the tape 10. The light which passes through the holes punched through the tape 10 is picked up by corresponding photocells 45. Although not shown in the FIGS., a plurality of photocells 45, each positioned beneath and corresponding to a corresponding one of the hole positions in a single transverse line of the tape 10, are positioned linearly beneath said tape. Thus, each of the photocells, which may comprise a photodiode, picks up only the light which is transmitted through its corresponding perforation or hole in the tape 10.

Figure 12:
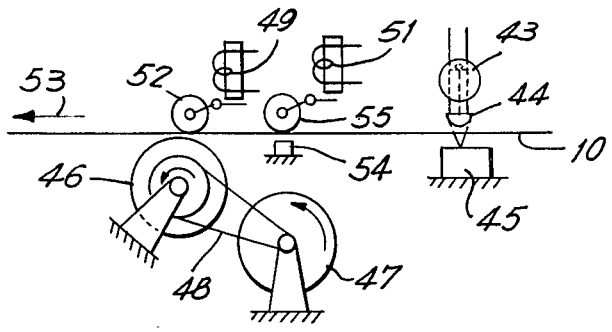
FIG. 12 is a schematic diagram of tape feeding apparatus which may be utilized in the pulse distribution system of the present invention.

FIG. 12 is a schematic diagram of tape feeding apparatus for moving or feeding the tape 10 of FIG. 2. A feed roller 46 is mechanically coupled to and continuously rotated by a continuously running motor 47 via a belt 48 or other suitable coupling or drive arrangement. When a feed magnet 49 is energized and a brake magnet 51 is deenergized, the tape 10 is held between a pinch roller 52 and the feed roller 46 and is fed or moved in the direction of an arrow 53. In the feed magnet 49 is deenergized and the brake magnet 51 is energized, the tape 10 is held between a brake shoe 54 and a pinch roller 55 and is stationary. Eight photodiodes 45, as explained with reference to FIGS. 10 and 11, are linearly positioned under the tape 10 in alignment with the lamp 43. Each of the eight photodiodes corresponds to a corresponding one of the eight channels representing the code punched in the tape 10.

Figure 13:
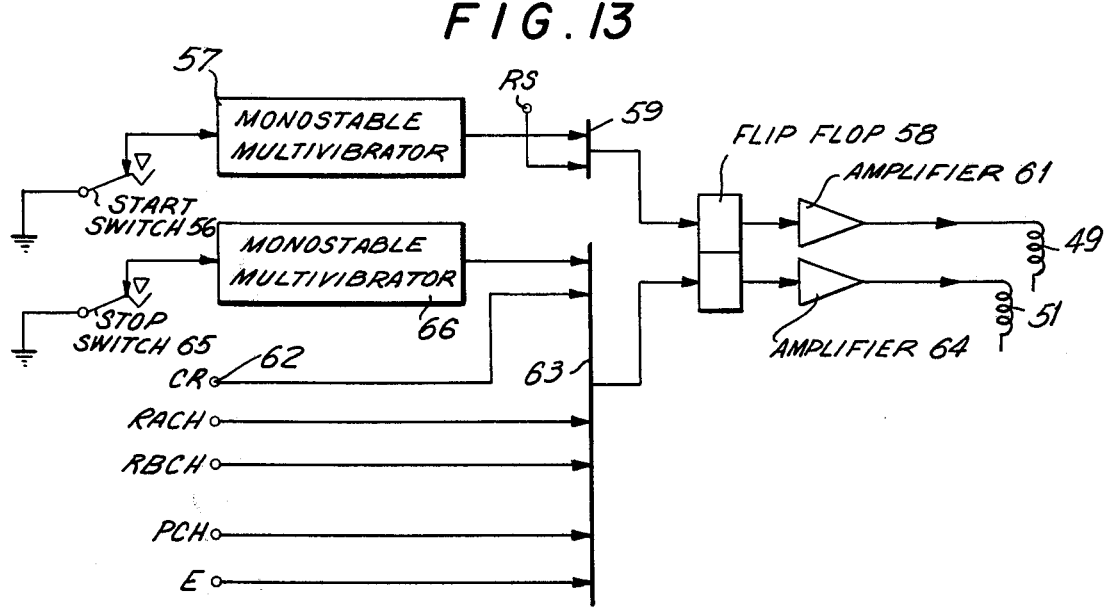
FIG. 13 is a block diagram of a tape readout drive circuit which may be utilized in the pulse distribution system of the present invention.

FIG. 13 discloses a tape readout drive circuit for controlling the energization of the feed magnet 49 and the brake magnet 51 of the tape feeding apparatus of FIG. 12. When a start switch 56 is closed, a first monostable multivibrator 57 is energized and a flip flop 58 is switched to its set condition via an OR gate 59. The feed magnet 49 is then energized via an amplifier 61. The tape 10 is then fed or moved in the direction of the arrow 53 (FIG. 12). When a CR code signal is supplied to an input terminal 62, indicating that the end of the pattern has been reached, the flip flop 58 is reset via an OR gate 63. The feed magnet 49 is then deenergized and the brake magnet 51 is energized via an amplifier 64. The tape 10 (FIG. 12) is then stopped and does not move. The same result may be attained by closing a stop switch 65 and thereby energizing a second monostable multivibrator 66.

Figure 14:
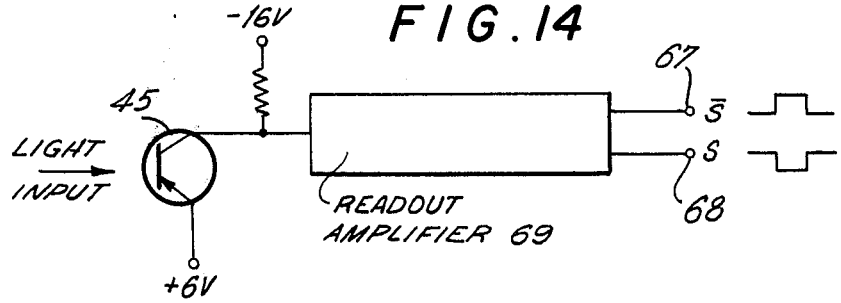
FIG. 14 is a circuit and block diagram for tape readout which may be utilized in the pulse distribution system of the present invention.

FIG. 14 shows a tape readout device which may be utilized as the tape readout device 11 of FIG. 2. In FIG. 14, when light from a light source (not shown in FIG. 14) impinges upon a photodiode 45 via a corresponding hole punched in the tape (not shown in FIG. 14), the electrical resistance of said photodiode varies, so that signals $\overline{S}$ and S are provided at output terminals 67 and 68, respectively, via a readout amplifier 69. The signals provided at the output terminals 67 and 68 correspond to the channels h1 and h8 of the tape 10 (FIG. 9) and are indicated as S1, $\overline{S1}$; S2, $\overline{S2}$; S3, $\overline{S3}$; . . . . . S7, $\overline{S7}$; S8, $\overline{S8}$.

Figure 15:
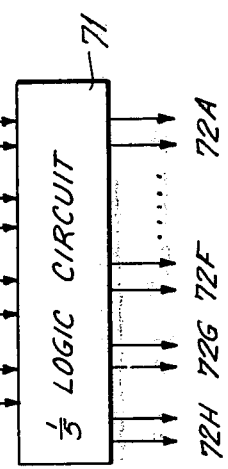
FIG. 15 is a schematic diagram illustrating the connections of a logic circuit which may be utilized in the pulse distribution system of the present invention.

FIG. 15 illustrates the connections of a logic circuit 71 which divides the number of pulses read out from the tape 10 (FIG. 2) by five. The logic circuit 71 is described in greater detail hereinafter. The logic circuit 71 functions to set the selected flip flops of the N register of FIG. 16 in accordance with the signals S1, $\overline{S1}$ to S4, $\overline{S4}$ corresponding to the first to fourth channels h1 to h4 of the tape 10 (FIG. 2).

Figure 16:
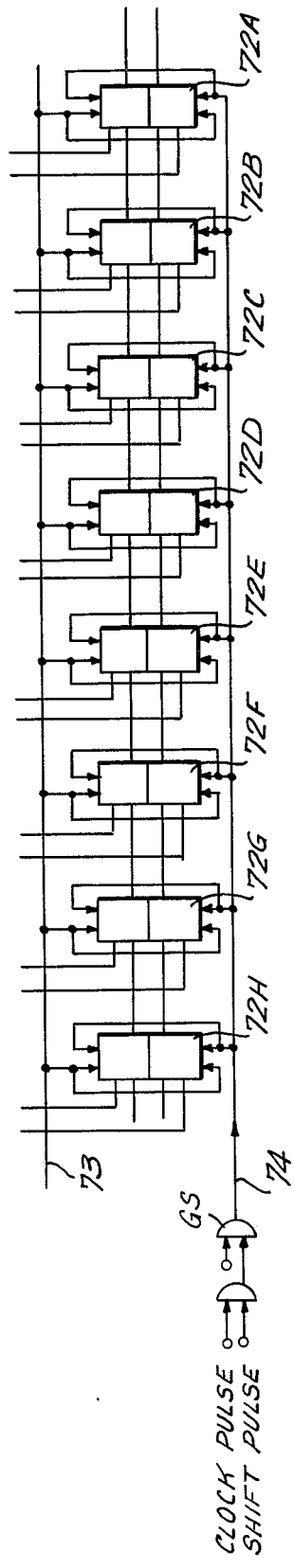
FIG. 16 is a block diagram of an N register which may be utilized in the pulse distribution system of the present invention.

FIG. 16 discloses an N register which functions to store the integral portion and the decimal portion of a numerical value or number which is provided by reducing, in the logic circuit 71 of FIG. 15, the input data to one fifth its value. The N register of FIG. 16 comprises eight dual input flip flops 72A to 72H. The N register of FIG. 16 functions not only to store the signals from the logic circuit 71 (FIG. 15), but also functions as a shift register, that is, signals from the logic circuit 71 of FIG. 15 are stored in the flip flops 72A to 72H when a pulse is provided in a lead 73. The signal stored in each of the flip flops 72A to 72H is shifted to the adjacent flip flop on the right, each time a pulse or signal is provided in a lead 74. The signal or pulse provided in the lead 74 is the shift pulse.

Figure 17:
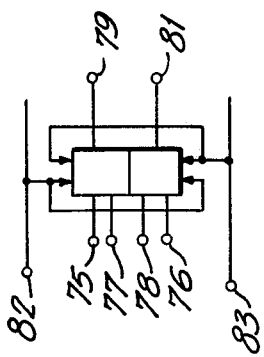
FIG. 17 is a block diagram of a dual input flip flop which may be utilized in the N register of FIG. 16.

FIG. 17 is a block diagram of a dual input flip flop of FIG. 16 which has four input terminals 75, 76, 77 and 78. The flip flop has two output terminals 79 and 81 and two trigger terminals 82 and 83. Logical input signals, which are inverse signals, are supplied to the input terminals 75 and 76, and correspond to the trigger terminal 82. That is, when a logical 1 signal is supplied to the input terminal 75, a logical 0 signal is supplied to the input terminal 76 and if a trigger pulse is simultaneously supplied to the trigger terminal 82, the flip flop is set. The flip flop then produces a logical 1 signal at the output terminal 79 and a logical 0 signal at the output terminal 81. If a logical 0 signal is supplied to the input terminal 76 and a trigger pulse is supplied to the trigger terminal 82, the flip flop is reset and a logical 0 signal is provided at the output terminal 79 and a logical 1 signal is provided at the output terminal 81.

The input terminals 77 and 78 correspond to the trigger terminal 83. Thus, if a trigger pulse is supplied to the trigger terminal 83 at the same time that a logical 1 signal is supplied to the input terminal 77 and a logical 0 signal is supplied to the input terminal 78, the flip flop is set and a logical 1 signal is provided at the output terminal 79 and a logical 0 signal is provided at the output terminal 81. If a trigger pulse is supplied to the trigger terminal 83 at the same time that a logical 0 signal is supplied to the input terminal 77 and a logical 1 signal is supplied to the input terminal 78, the flip flop is reset and a logical 0 signal is provided at the output terminal 79 and a logical 1 signal is supplied at the output terminal 81.

FIG. 18 is a circuit diagram of a dual input flip flop, as shown in FIG. 17 and as utilized in the N register of FIG. 16. If a transistor 84 in FIG. 18 is in its conductive condition, its collector potential, which is the potential at the output terminal 79, is 0 volts. A voltage of +6 volts is divided by resistors 85 and 86, so that the base potential of a transistor 87 becomes positive and said transistor is switched to its non-conductive condition. The collector potential of the transistor 87, which is the potential at the output terminal 81, is therefore −4 volts, which is the logical 1 signal.

If an input voltage of −4 volts, or logical 1, is supplied to the input terminal 77 and an input voltage of 0 volts, or logical 0, is supplied to the input terminal 78, and a positive trigger pulse is simultaneously supplied to the trigger input terminal 82, a positive potential is applied to the base of the transistor 84 via a diode 88 and said transistor is switched to its non-conductive condition. The potential at the output terminal 79 then becomes −4 volts, or logical 1. At the instant that the transistor 84 is switched to its non-conductive condition, the base potential of the transistor 87 becomes negative and the transistor 87 is switched to its conductive condition. The potential at the output terminal 81 then becomes 0 volts, or logical 0.

If 0 volts is supplied to the input terminal 75 and −4 volts is supplied to the input terminal 76, and a positive trigger pulse is simultaneously supplied to the trigger input terminal 83, at a time when the transistor 84 is in its non-conductive condition and the transistor 87 is in its conductive condition, a positive potential is applied to the base of the transistor 87 through a diode 89 and said transistor 87 is switched to its non-conductive condition. The potential at the output terminal 81 then becomes −4 volts, the base potential of the transistor 84 becomes negative, and said transistor 84 is switched to its conductive condition. The potential at the output terminal 79 then becomes 0 volts.

Figures 19, 20:
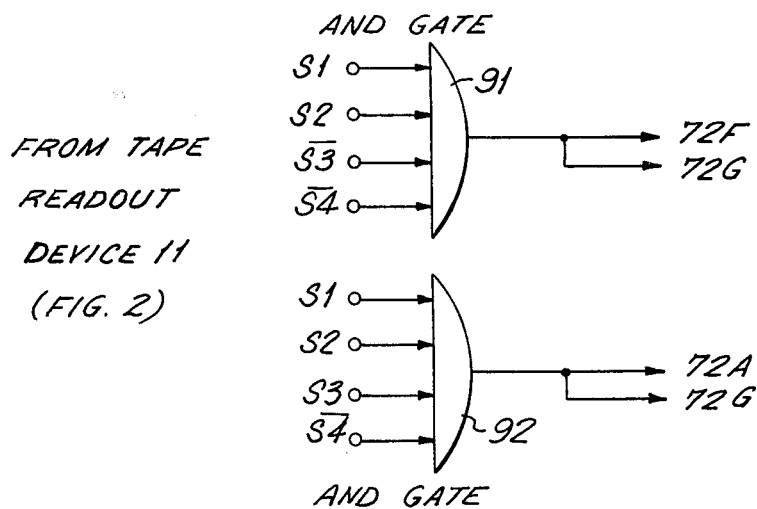
FIG. 19 is a tabular presentation illustrating data conversion in the logic circuit of FIG. 15.
FIG. 20 is a circuit diagram of a logic circuit which may be utilized as the logic circuit of FIG. 15.

As hereinbefore described, the coded decimal numbers read out from the tape 10 (FIG. 2) are reduced to one fifth the number actually read out in the logic circuit 71 (FIG. 15) and are stored in the N register (FIG. 16). Numerical values or numbers of 0 to 9 are read out by the tape readout device 11 (FIG. 2) in sequential columns or transverse lines of the binary code. The numbers read out are then reduced to one fifth and the integral portions of the numbers are stored in the flip flops 72A to 72D of the N register of FIG. 16 and the decimal portions of the numbers are stored in the flip flops 72E to 72H of said N register. FIG. 19 tabulates the numbers read out by the tape readout device 11 and the numbers stored in the N register of FIG. 16. In FIG. 19, the numbers 1 to 9 and 0 in the lefthand column indicate decimal numbers read out by the tape readout device 11. S1, S2, S3 and S4 indicate, in binary code decimal representation, the signals read out from the tape 10 (FIG. 2). The flip flops, storage or memory units 72A to 72H of the N register of FIG. 16 are represented as such in FIG. 19.

If it is assumed, for the purpose of illustration, that a decimal number 3 is read out, the logic circuit 71 of FIG. 15 provides a logical 1 signal to each of the units 72F and 72G of the N register of FIG. 16. The binary code representation for the number 3 is 0011. If the number 7 is read out, the logic circuit 71 provides a logical 1 signal to each of the units 72A and 72G of the N register. The binary representation of the number 7 is 0111. The selection of the storage units of the N register is determined by the facts that since 3/5 = 0.6, 0 is stored in the integral portion 72A to 72D of the N register and 6 is stored in the decimal portion 72E to 72H of the N register. The number 6 is represented in binary code as 0110. The number 3 is therefore indicated as 0000 and 0110 in the storage units of the N register. Since 7/5 = 1.4, 1 is stored in the integral portion 72A to 72D of the N register, so that 0001, which is the binary representation of the number 1, is stored in such integral portion. The decimal portion of the number 1.4, which is 4, is stored in the decimal portion 72E to 72H of the N register in its binary code representation 0010. The number 7 is thus stored in the N register as 1000 − 0010.

FIG. 20 illustrates a logic circuit which may be utilized as the logic circuit 71 of FIG. 15. In FIG. 20, and AND gate 91 transfers a logical 1 signal to the storage units 72F and 72G of the N register of FIG. 16 when 0011 is read out by the tape readout device 11 of FIG. 2 and is supplied to the inputs of said AND gate. An AND gate 92 transfers logical 1 signals to the storage units 72A and 72G of the N register when 0111 is read out by the readout device 11 of FIG. 2 and is supplied to the input terminals of said AND gate.

Figure 21:
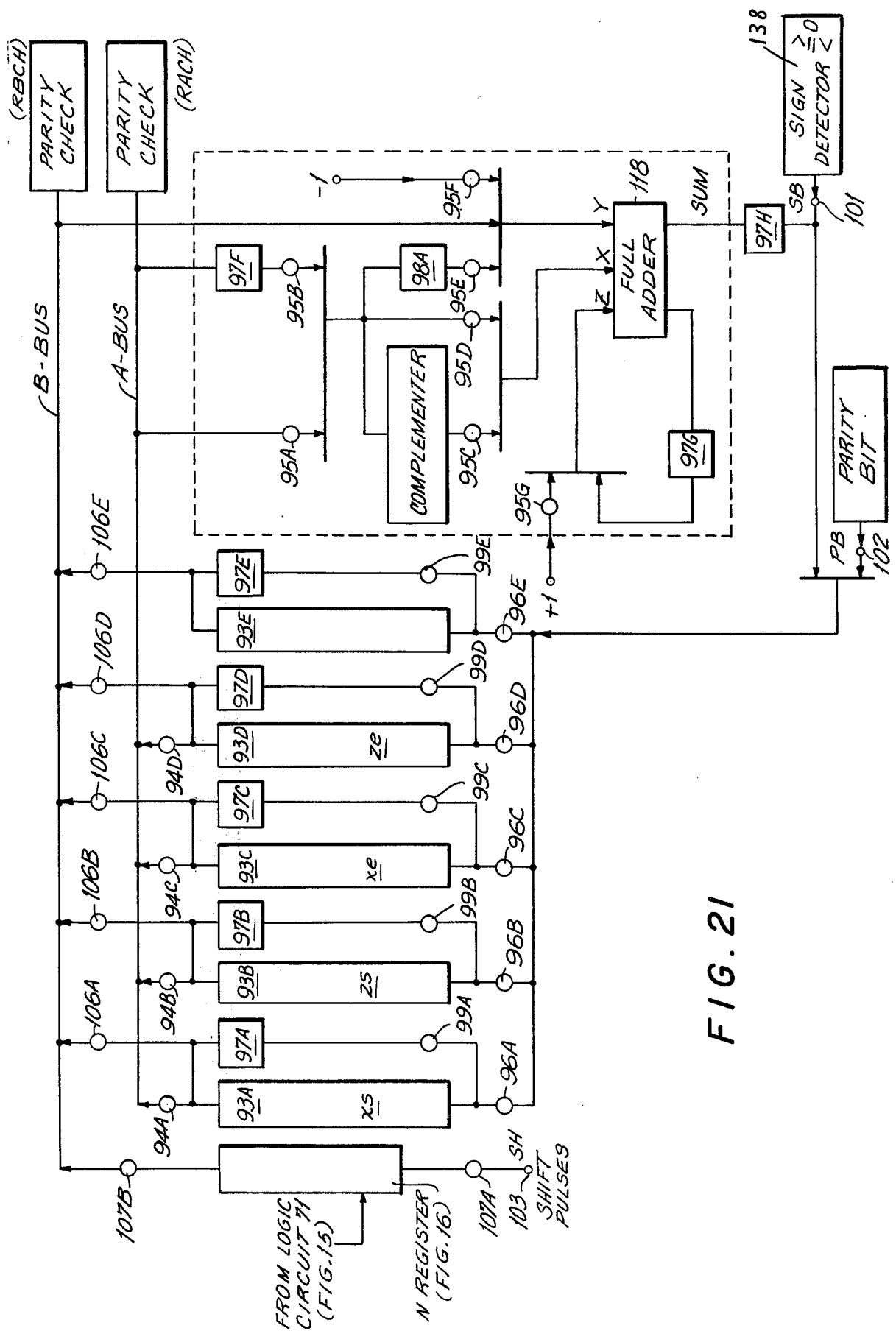
FIG. 21 is a block diagram of an interpolator which may be utilized in the pulse distribution system of the present invention.

FIG. 21 illustrates an interpolator which is known as an algebraic operation system, and which may be utilized as the interpolator 14 of FIG. 2. In FIG. 21, each of the registers 93A, 93B, 93C, 93D and 93E comprises any suitable register such as, for example, a known nickel type delay line. A number 3.575/0.005 = 715 is provided by converting the X coordinate 3.575 mm of the start point of the curve of FIG. 8 into a number of pulses of minor resolution of 0.005 mm per pulse, since the number 3.575 is stored in the register 93A, which stores the X coordinate xs of the start point. Similarly, the number 1.230/0.005 = 246 is provided by converting the Z coordinate 1.230 mm of the start point of the curve of FIG. 8 into a number of pulses of minor resolution, the number 1.230 being stored in the register 93B, which stores the Z coordinate of the start point. Each of the registers 93A to 93D stores its corresponding numbers in binary form.

The register 93C stores the X coordinate xe of the end point and the register 93D stores the Z coordinate ze of the end point of the curve of FIG. 8. A number 1.230/0.005 = 246 is provided by converting the X coordinate of the end point of the curve of FIG. 8 and a number 3.575/0.005 = 715 is provided by converting the Z coordinate of the end point. The register 93E is an auxiliary register.

A number stored in the register 92A may be doubled by making gates 94A, 95B, 95D and 96A conductive and by transferring such number through a one bit delay circuit 97F. The number stored in the register 93A may be multiplied eight times by making the gates 94A, 95B, 95E and 96A conductive and transferring the number through the gates 94A, 95B, 95E and 96A and through the one bit delay circuit 97G and a two bit delay circuit 98A. In FIG. 21, each of the delay circuits 97A to 97H is a one bit delay circuit of any suitable type known in the art and 98A is a two bit delay circuit of any type known in the art. It is thus possible to multiply the number stored in the register 93A ten times and to restore the product in said register by making the gates 94A, 95B, 95D, 95E and 96A conductive. The registers 93A to 93E normally circulate their contents via the one bit delay circuits 97A to 97E, respectively, and through gates 99A to 99E, respectively, to provide shaped waveforms.

In FIG. 22, curve A shows the waveform of clock pulses. Curve B shows the waveform of word pulses. Curve C shows the waveform of a pulse expressing constant +1. Curve D shows the waveform of a pulse expressing constant −1. Curve E shows the waveform of a sign bit SB supplied to an input terminal 101 of FIG. 21. Curve F shows the waveform of a parity bit PB supplied to an input terminal 102 of FIG. 21. Curve G of FIG. 22 shows the waveform of shift pulses SH supplied to an input terminal 103 of FIG. 21.

FIG. 23 is a letter register for storing signals read out from the tape 10 by the tape readout device 11 of FIG. 2. The letter register of FIG. 23 comprises eight flip flops or storage units 104A to 104H. Each of the flip flops 104A to 104H corresponds to a corresponding channel of the tape 10 (FIG. 1). The signals S1, $\overline{S1}$; S2, $\overline{S2}$; S3, $\overline{S3}$; . . . S8, $\overline{S8}$ provided by the tape readout device 11 are supplied to the flip flops 104A to 104H, respectively.

FIG. 24 shows a decoder for the letter U, which may be utilized in the system of the present invention, and FIG. 25 shows a decoder for the letter V, which may be utilized in the system of the present invention. Each of FIGS. 24 and 25 comprises and AND gate. The inputs to the AND gate of each of FIGS. 24 and 25 are provided by the letter register of FIG. 23. The output of the AND gate of FIG. 24 is provided at an output terminal 105A and the output of the AND gate of FIG. 25 is provided at an output terminal 105B. The output terminals 105A and 105B, as well as additional terminals 105C and 105D (not shown in FIGS. 24 and 25), constitute input terminals of a gate control circuit shown in FIG. 26.

Figure 26:
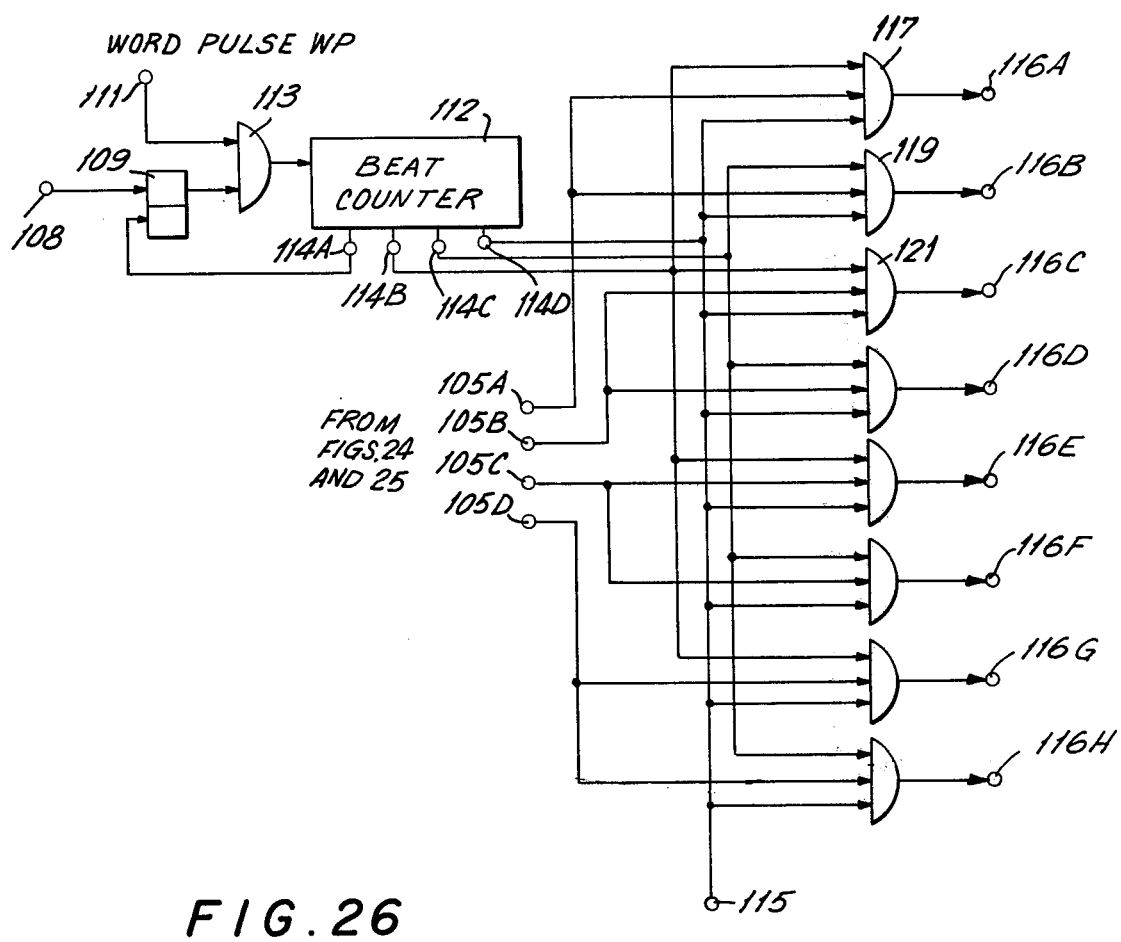
FIG. 26 is a block diagram of a gate control circuit which may be utilized to control specified gates of the interpolator of FIG. 21.

FIG. 26 discloses a gate control circuit for controlling the gates 94A to 94D, 106A to 106E, 96A to 96E, 95A to 95G and 107A and 107B of the interpolator of FIG. 21. When a signal recorded in the tape 10 of FIG. 2 and read out by the tape readout device 11 is supplied to an input terminal 108 of the gate control circuit of FIG. 26, said signal switches a flip flop 109 to its set condition. When a word pulse WP is supplied to an input terminal 111, it is transferred to a beat counter 112 via an AND gate 113. The signal supplied to the input terminal 108 is provided at an output terminal 114A of the beat counter 112.

When numbers are read out from the tape 10 by the tape readout device 11 of FIG. 2, signals representing such numbers are supplied to an input terminal 115 of the gate control circuit of FIG. 26. The signals supplied to the input terminal 115 are transferred to an output terminal 116A via an AND gate 117, due to the fact that a signal is simultaneously supplied to another input of said AND gate from the output terminal 114B of the beat counter 112 and a signal is also simultaneously supplied to a third input of said AND gate from the input terminal 105A. If an output signal is provided at the output terminal 116A of the gate control circuit, the gates 94A, 96A, 95B, 95D and 95E are switched to their conductive condition, as shown in FIG. 27.

Part of the content of the register 93A of the interpolator of FIG. 21 is thus doubled by being passed through the one bit delay circuit 97F of said interpolator and the other part of the content of said register is multiplied eight times by being transferred through the delay lines 97F and 98A of said interpolator. The doubled and octupled numbers are then added in a full adder 118 of the interpolator of FIG. 21. The result is that the content of the register 93A is multiplied ten times and returned to said register.

When the next word pulse XP is supplied to the input terminal 111 of the gate control circuit of FIG. 26, a signal is no longer provided at the output terminal 114B of the beat counter 112, but is provided at the output terminal 114C thereof, instead. A signal is then provided at an output terminal 116B of the gate control circuit via an AND gate 119 when signal is simultaneously supplied to the input terminal 108 and to the input terminal 115 of the gate control circuit. When an output signal is provided at the output terminal 116B of the gate control circuit of FIG. 26, the gates 94A, 96A, 95A, 95D and 107A and 107B are switched to their conductive condition, as shown in FIG. 27. As a result, a shift pulse is supplied to the N register and four bits from the column of lowest numerical order of the stored content of said N register are shifted and added in the full adder 118 of the interpolator of FIG. 21. The result is stored in the register 93A of the interpolator. This operation, as well as the aforedescribed operation, is shown in tabular form in FIG. 28.

As hereinbefore described, a code combination of letters and number such as, for example, U 3575 V 1230 X 1230 Z 3575 is recorded or stored in the tape 10 (FIG. 2). When the tape readout device 11 of FIG. 2 reads out the letter U, the readout signal is stored in the letter register of FIG. 23 and is decoded by the decoder of FIG. 24. When the next succeeding number 3, or 0011, is read out, logical 1 is set in the flip flops 72F and 72G of the N register of FIG. 16, as shown in FIG. 19. The content of the N register is then 01100000. The content of the registers 93A to 93D of the interpolator of FIG. 21 is 0. As hereinbefore described, the content of the register 93A of the interpolator 21 is multiplied ten times when the first word pulse appears. However, the content of the register 93A is initially 0.

When the next word pulse is supplied, the gates 107A and 107B of the interpolator of FIG. 21 are switched to their conductive condition and four bits from the column of the lowest numerical order of the content of the N register of FIG. 16 are shifted and are added in the full adder 118 of said interpolator and the result is stored in the register 93A. At such point, the content of the first register 93A is 0 . . . 0000000000 and the content of the N register is 00000110.

When the number 5, or 0101, is read out by tape readout device 11 of FIG. 2, logical 1 is set in the flip flop 72A of the N register of FIG. 16, as indicated in FIG. 19. The content of the N register then becomes 00000111. During this operation, a signal is provided at the output terminal 114A of the beat counter 112 of the gate control circuit of FIG. 26. A signal appears at the output terminal 116A of the gate control circuit simultaneously with the readout of the number 5 and the supply of a word pulse, due to the provision, under such circumstances, of a signal at the output terminal 114B of the beat counter 112. The content of the register 93A of the interpolator of FIG. 21 is thus multiplied ten times although its content at such time is 00 . . . 0000000000.

When the next word pulse is supplied to the input terminal 111 of the gate control circuit of FIG. 26, a signal is provided at the output terminal 114C of the beat counter 112, so that an output signal is provided at the output terminal 116B. This causes the gates 94A, 96A, 95A, 95D and 107A and 107B to be switched to their conductive condition, so that four bits from the column of the lowest numerical order of the content of the N register of FIG. 16 are shifted and are added to the content of the register 93A of the interpolator of FIG. 21. The content of the register 93A then becomes 00 . . . 0000000111 and the content of the N register becomes 00000000.

When the number 7 is read out by the tape readout device 11 of FIG. 2, logical 1 is set in the flip flops 72A and 72G of the N register of FIG. 16, as shown in FIG. 19. The content of the N register then becomes 01000001. A signal is then provided at the output terminal 114B of the beat counter 112 of the gate control circuit of FIG. 26, and an output signal is accordingly provided at the output terminal 116A. The content of the register 93A of the interpolator of FIG. 21 is then multiplied ten times. The content of the register 93A then becomes 00 ... 0001000110. Four bits from the column of the lowest numerical order of the content of the N register of FIG. 16 are then shifted and added to the content of the register 93A. As a result, the content of the register 93A becomes 00 ... 0001000111 and the content of the N register becomes 00000100.

When the number 5 is read out by the tape readout device 11 of FIG. 2, logical 1 is set in the flip flop 72A of the N register of FIG. 16, as shown in FIG. 19. As a result, the content of the N register becomes 00000101. During such operation, the content of the register 93A of the interpolator of FIG. 21 becomes 00 ... 0101100110 by being multiplied ten times. Then, when four bits of the content of the N register are shifted and are added to the content of the register 93A, the content of the register 93A becomes 00 ... 0101100101 1. The content of the register 93A is then $2^0 + 2^1 + 2^3 + 2^6 + 2^7 + 2^9 = 715$, which is the number of pulses converted from the X coordinate of the start point $xs$ of the curve of FIG. 8 at a minor resolution of 0.005 mm per pulse.

When the letter V is read out by the tape readout device 11 of FIG. 2, it is stored in the letter register of FIG. 23 and is then decoded in the decoder of FIG. 25. A signal is then supplied from the decoder of FIG. 25 to the input terminal 105B of the gate control circuit of FIG. 26. When a word pulse is supplied to the input terminal 111, a signal is provided at the output terminal 114B of the beat counter 112 and an output signal is provided at an output terminal 116C of the gate control circuit via an AND gate 121. The gates 94B, 96B, 95B, 95D and 95E are then switched to their conductive condition, as shown in FIG. 27, and the register 93B of the interpolator of FIG. 21 is operated in the same manner as hereinbefore described.

The binary number 000 ... 011110110 is finally stored in the register 93B of the interpolator of FIG. 21. This number is $2^1 + 2^2 + 2^4 + 2^5 + 2^6 + 2^7 = 246$, which is equal to the number of pulses converted from the Z coordinate of the start point $zs$ of the curve of FIG. 8 of minor resolution of 0.005 mm per pulse. A similar operation is completed in the registers 93C and 93D of the interpolator of FIG. 21. 00 ... 011110110 is stored in the register 93C and 00 ... 0101100101 1 is stored in the register 93D.

Figure 29:
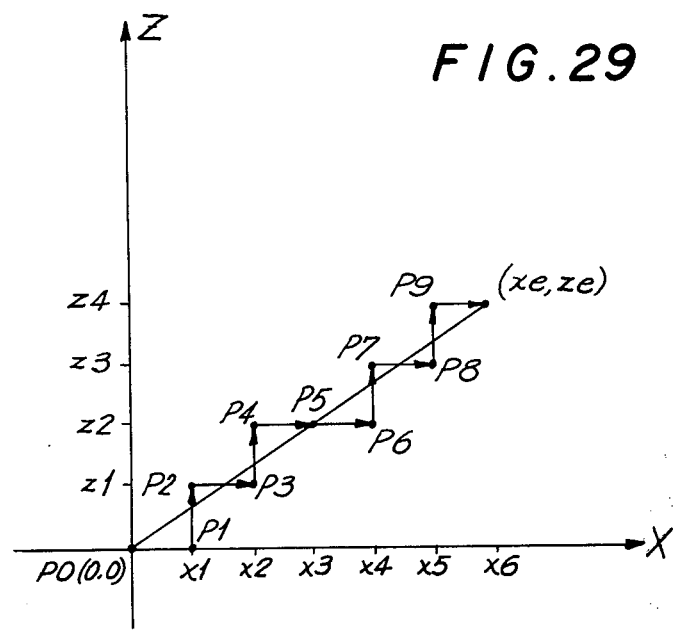
FIG. 29 is a graphical presentation illustrating the interpolation of a straight line by the interpolator of FIG. 21.
Figure 30:
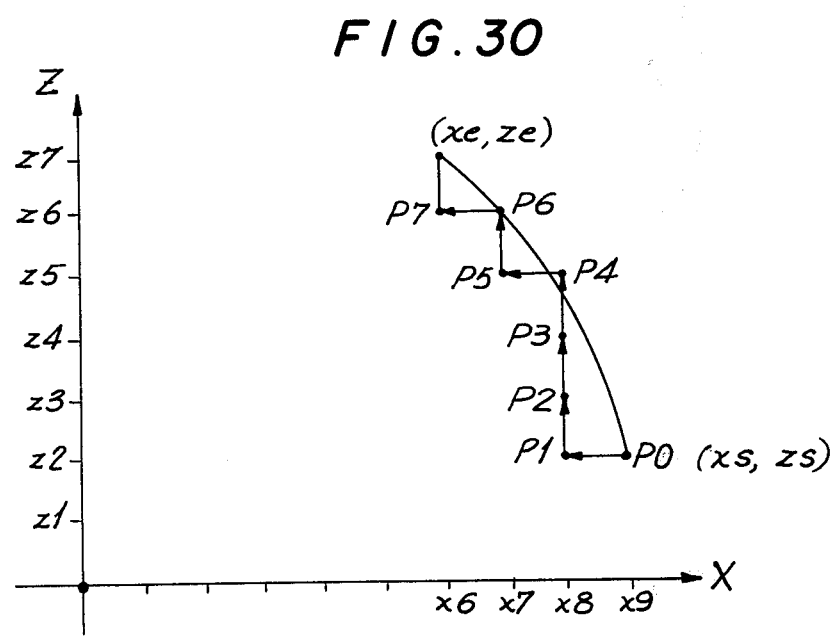
FIG. 30 is a graphical presentation illustrating the interpolation of an arc by the interpolator of FIG. 21.

FIG. 29 illustrates the interpolation of straight line by the interpolator of FIG. 21. FIG. 30 illustrates the interpolation of an arc by the interpolator of FIG. 21.

In interpolating a straight line, the start point is set at the origin of the coordinate system and the coordinates $xe$, $ze$ of the end point are stored in the registers 93C and 93D of the interpolator as input data. In the distribution of the pulses, one pulse is first supplied to move the component 25 of FIG. 2 along the X axis. At such time, the controlled component 25 of FIG. 2 is located at a point P1. A determination is then made as to whether the point P1 is located in the positive area or the negative area formed by the line. Since, in FIG. 29, the point P1 is in the negative area, one pulse is supplied to move the component 25 along the Z axis. The controlled component 25 of FIG. 2 is then moved to a point P2. Since the point P2 is in the positive area formed by the straight line, one pulse is supplied to move the component 25 along the X axis and said component is then moved to a point P3. This operation is repeated, and the component 25 is moved by pulses, from the point P3 to a point P4, then to a point P5, then to a point P6, then to a point P7, then to a point P8, then to a point P9 and, finally, to the end point $xe$, $ze$.

A discriminant D, defined as $$D = xez - zex \qquad (1)$$

as utilized to determine whether the points P1 to P9 of the line are in the positive or negative areas formed by the line. In Equation (1), xe and ze are the number of pulses converted from the X coordinate and the Z coordinate, respectively, of the end point xe, ze of the straight line.

When the discriminant $D_{i,j}$ of a point (not shown) $xi$, $zj$ of FIG. 29 is defined as $$D_{i,j} = xezj - zexi \qquad (2)$$

in accordance with Equation (1), the discriminant $D_{i+1,j}$ of the next point $xi + 1, zj$ may be expressed as $$D_{i+1,j} = D_{i,j} - ze \qquad (3)$$

The discriminant $D_{i,j+1}$ of a point $xi$, $zj + 1$ may be expressed as $$D_{i,j+1} = D_{i,j} + xe \qquad (4)$$

The discriminant utilized to determine the location of a point in the positive or negative area formed by an arc having its center at the origin, as shown in FIG. 30, is $$D = x^2 + z^2 - (xs^2 + zs^2) \qquad (5)$$

wherein the components of the start point are xs, zs and the components of the end point are $xe$, $ze$.

When the discriminant $D_{i,j}$ at a point $xi$, $zj$ may be expressed as $$D_{i,j} = xi^2 + zj^2 - (xs^2 + zs^2) \qquad (6)$$

the discriminant $$D_{i-1,j} = D_{i,j} - 2xi+1 \qquad (7)$$

The discriminant $D_{i,j+1}$ of a point $xi$, $zj+1$ may be expressed as $$D_{i,j+1} = D_{i,j} + 2zj + 1 \qquad (8)$$

Figure 31:
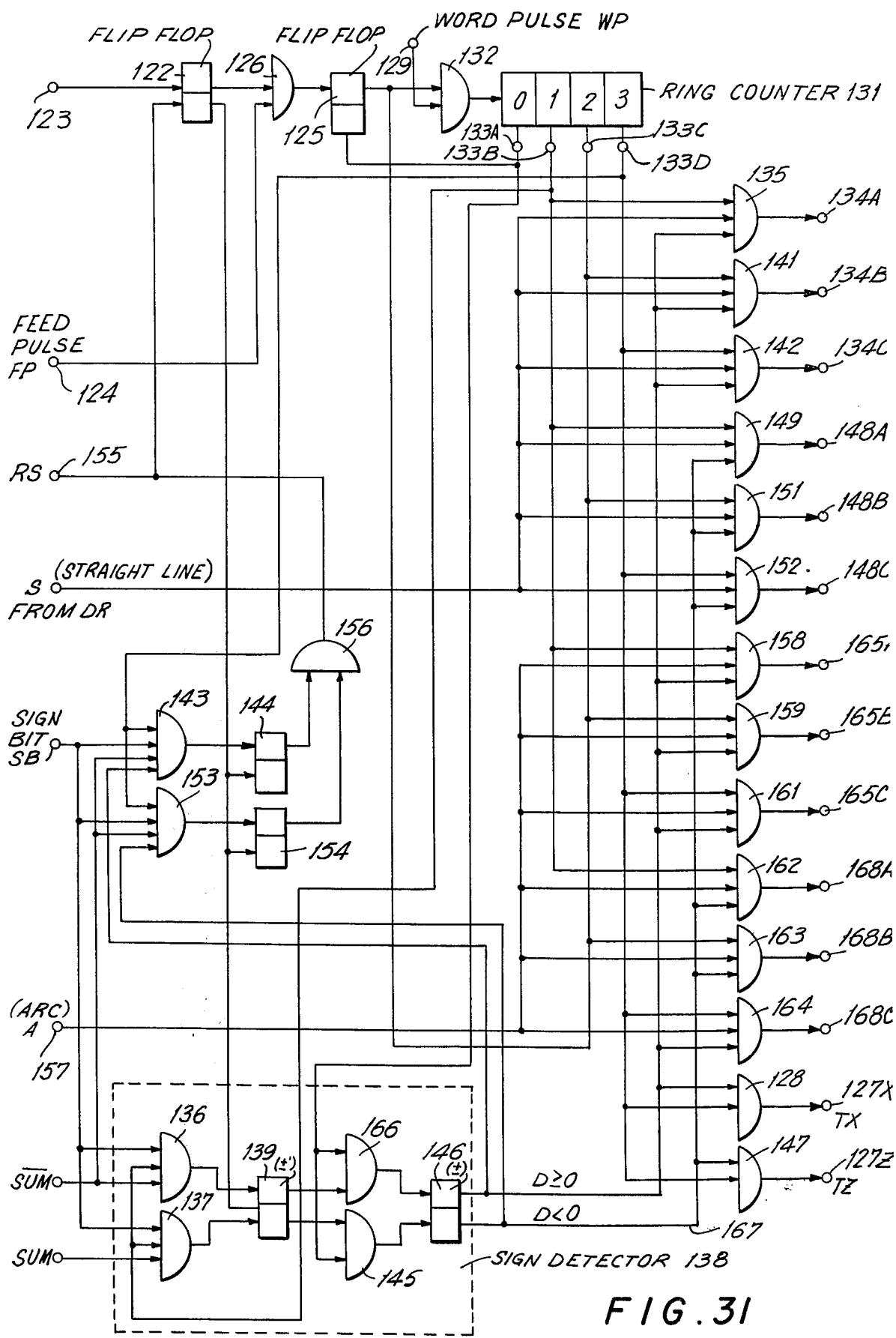
FIG. 31 is a block diagram of a gate control circuit for controlling other gates of the interpolator of FIG. 21.

FIG. 31 illustrates a gate control circuit for controlling other gates of the interpolator of FIG. 21. The circuit of FIG. 31 functions to control the interpolation of the curve or pattern to be followed by the component 25 of FIG. 2. In controlling the interpolation of the straight line of FIG. 29, the coordinates xe, ze of the end point are stored in the registers 93C and 93D of the interpolator of FIG. 21. When the data relating to one curve, stored or recorded in the tape 10 of FIG. 2, is read out by the tape device 11, a signal is supplied to a flip flop 122 via an input terminal 123 of FIG. 31 and said flip flop is switched to its set condition. Therefore, when one feed pulse FP is supplied to an input terminal 124, a flip flop 125 is switched to its set condition via an AND gate 126. A single pulse is consequently provided at an output terminal 127X via a gate 128.

When a word pulse WP is supplied to an input terminal 129, a signal is supplied to a ring counter 131 via an AND gate 132 and said counter provides an output signal at its output terminal 133B. An output signal is then provided at an output terminal 134A via a gate 135. This results in the switching of the gates 94D, 96E, 95A and 95C of the interpolator of FIG. 21 to their conductive condition, as shown in FIG. 32. The content of the register 93D of the interpolator of FIG. 21 is then subtracted from the content of the register 93E of said interpolator and the resultant difference is stored in the register 93E. This operation may be accomplished by determining the value of the discriminant in accordance with Equation (3).

The sign or polarity of the discriminant may be determined by a gate 136 or a gate 137 of the gate control circuit of FIG. 31. The gates 136 and 137 are part of a sign detector 138 which is included in the gate control circuit of FIG. 31. The sign detector 138 of FIG. 31 is shown as the block 138 included with the interpolator of FIG. 21. As a result of the foregoing operation, a signal is provided by the sign detector and is supplied to the input terminal 101 of the interpolator of FIG. 21. The sign signal is stored in a sign register which comprises a flip flop 139. The flip flop 139 is reset via an AND gate 137.

When a word pulse WP is supplied to the input terminal 129 of the gate control circuit of FIG. 31, the ring counter 131 provides a signal at its output terminal 133C and an output signal is provided at an output terminal 134B via an AND gate 141. As a result, the gates 94A, 96A, 95A, 95D and 95G of the interpolator of FIG. 21 are switched to their conductive condition, as shown in FIG. 32. A constant +1 is added to the content of the register 93A of the interpolator of FIG. 21. In other words, the X coordinate of the actual position of the movement-controlled component 25 (FIG. 2) is stored in the register 93A. When another word pulse WP is supplied to the input terminal 129, the ring counter 131 provides a signal at its output terminal 133D and an output signal is provided at an output terminal 134C via an AND gate 142. The gates 94C, 106A, 95A, 95C of the interpolator of FIG. 21 are thus switched to their conductive condition, as shown in FIG. 32. The content of the register 93C of the interpolator is thereby subtracted from the content of the register 93A and the resultant difference detected by an AND gate 143 of the gate control circuit of FIG. 31.

The AND gate 143 of the gate control circuit of FIG. 31 determines whether the X coordinate of the actual position of the component 25 (FIG. 2) coincides or does not coincide with the X coordinate of the end point of the pattern of curve through which said component is being moved. When the X coordinates coincide with each other, the AND gate 143 transfers a signal to a flip flop 144 and sets said flip flop. When a word pulse is supplied to the input terminal 129 and a signal is provided by the ring counter 131 at its output terminal 133A, the flip flop 125 is reset. Furthermore, an AND gate 145 is switched to its conductive condition and transfers a signal to a sign register 146. The sign register 146 comprises a flip flop which is reset by the signal transferred by the AND gate 145.

When the next feed pulse FP is supplied to the AND gate 126 via the input terminal 124, a signal provided in the output 133A of the ring counter 131 is transferred to the flip flop 146, resets said flip flop and switches an AND gate 147 to its conductive condition. An output signal is thus provided at an output terminal 127Z. When a signal is provided at the output terminal 133B of the ring counter 131, upon the supply of the next word pulse to the input terminal 129, an output signal is provided at an output terminal 148A via an AND gate 149. The gates 94C, 96E, 95A and 95D of the interpolator of FIG. 21 are then switched to their conductive condition, as indicated in FIG. 32. The content of the register 93C of the interpolator of FIG. 21 is thus added to the content of the register 93E and the resultant sum is stored in the register 93E. The foregoing operation is in accordance with Equation (4). The polarity or sign of the discriminant, which is + in this case, is determined by the AND gate 136 of the gate control circuit of FIG. 31. The sign register or flip flop 139 is thus set.

When a word pulse is supplied to the input terminal 129 of the gate control circuit of FIG. 31 and a signal is provided at the output terminal 133B of the ring counter 131, an output signal is provided at an output terminal 148B via an AND gate 151 and +1 is added to the content of the register 93B of the interpolator of FIG. 21. The resultant sum is stored in the register 93B. When a signal is provided at the output terminal 133D of the ring counter 131, due to the supply of the next word pulse, an output signal is provided at an output terminal 148C via an AND gate 152. The content of the register 93D is subtracted from the content of the register 93B of the interpolator of FIG. 21. The polarity or sign of the data provided by the foregoing operation may be determined by an AND gate 153 of the gate control circuit of FIG. 31. When the Z coordinate of the actual position of the component 25 of FIG. 2 coincides with the Z coordinate of the end point of the pattern to be followed by said component, the AND gate 153 is switched to its conductive condition and sets a flip flop 154.

Repetition of the foregoing operation causes the transfer of feed pulses, one at a time, via the output terminal 127X or 127Z of the gate control circuit of FIG. 31 and causes the component 25 (FIG. 2) to be moved to the end point xe, ze via points P1 . . . P9 of FIG. 29. When the component 25 reaches the end point of the pattern or curve, this may be indicated by the provision of a signal RS at an output terminal 155 via an AND gate 156, when the sign of the data provided by the operation during the last cycle of the ring counter 131, as described has varied from − to +; that is, when both flip flops 144 and 154 have been set so that the AND gate 156 is switched to its conductive condition. When the signal RS is provided at the output terminal 155, the flip flop 122 is reset and the pulse distribution operation is completed. The operation of the ring counter 131 of the gate control circuit of FIG. 31 in its four cycles of operation, 0, 1, 2, 3, are shown in FIG. 33.

The interpolation of an arcuate curve or pattern, as shown in FIG. 30, having a center at the origin, a start point xs, zs and an end point xe, ze, is as follows. When the code instructions of the tape 10 are read out by the tape readout device 11 of FIG. 2, indicating that an arc is the pattern to be followed, along with other numerical data, a signal A is supplied to an input terminal 157 of the gate control circuit of FIG. 31 and prepares AND gates 158, 159, 161, 162, 163 and 164 for operation. A signal is also supplied to the input terminal 123 and sets the flip flop 122. When a feed pulse FP is supplied to the input terminal 124, the flip flop 125 is set via the gate 126 and an output pulse is provided at the output terminal 127X via the AND gate 128.

When a word pulse WP is supplied to the input terminal 129 of the gate control circuit of FIG. 31, a signal is provided at the output terminal 133B of the ring counter 131 and an output signal is provided at an output terminal 165A via the AND gate 158. The gates 94A, 96E, 95B, 95C and 95G of the interpolator of FIG. 21 are switched to their conductive condition, as shown in FIG. 32. An operation (93E) − 2(93A) + 1 is performed in the interpolator of FIG. 21 and the result is stored in the register 93E. In the foregoing indication, (93E) indicates the content of the register 93E and (93A) indicates the content of the register 93A. This operation is indicated by Equation (7) for the discriminant. The sign or polarity of the discriminant may be detected by the AND gate 136 or 137 of the gate control circuit of FIG. 31 in the same manner as hereinbefore described. Since the sign of the discriminant is negative in this case, the register or flip flop 139 is reset.

In the next cycle 2, an output signal is provided at an output terminal 165B via the AND gate 159, so that a constant 1 is subtracted from the content of the register 93A of the interpolator of FIG. 21 and the result is stored in said register. In the next cycle 3, the content of the register 93A is subtracted from the content of the register 93C and the difference between the actual position of the component 25 of FIG. 2 and the end point of the pattern to be followed by said component is determined or detected. In the next cycle 0, the flop flop 125 is reset by a signal provided at the output terminal 133A of the ring counter 131. The content of the sign register or flip flop 139 is transferred to the sign register or flip flop 146 via an AND gate 166 and the AND gate 145. A signal is thus provided in a lead 167 from the reset output of the flip flop 146. When another feed pulse FP is supplied to the input terminal 124, the flip flop 125 is set and an output pulse is provided at the output terminal 127Z via the AND gate 147.

When a word pulse WP is supplied to the input terminal 129 during the cycle 1, a signal is provided at the output terminal 133B of the ring counter 131 of the gate control circuit of FIG. 31 and an output signal is provided at an output terminal 168A via the AND gate 162. The gates 94B, 96E, 95B, 95D and 95G of the interpolator of FIG. 21 are switched to their conductive condition by the output signal at the output terminal 168A. An operation (93E) + 2(93B) + 1 is performed in the interpolator of FIG. 21. This operation is that of Equation (8) of the discriminant. The sign or polarity of the discriminant is determined by the AND gate 136 or 137 of the gate control circuit of FIG. 31 and is set in the sign register or flip flop 139. Since the discriminant is negative in this case, the flip flop 139 is reset.

In the next cycle 2, +1 is added to the content of the register 93B of the interpolator of FIG. 21 and the result is stored in said register. In the next cycle 3, the content of the register 93D is subtracted from the content of the register 93B. This operation is for the purpose of determining the difference between the Z coordinate of the actual position of the component 25 of FIG. 2 and the Z coordinate of the end point of the pattern to be followed by said component.

A repetition of the foregoing operations transfers pulses, one at a time, from the output terminals 127X or 127Z of the gate control circuit of FIG. 31, and causes the component 25 (FIG. 2) to move through the points P0 to P7 and the end point, as shown in FIG. 30. When the component 25 reaches the end point xe, ze of the pattern, both flip flops 144 and 154 of the gate control circuit of FIG. 31 are set and an end signal RS is provided at the output terminal 155 via the AND gate 156. The flip flop 122 is reset by the signal transferred by the AND gate 156 and the control operation is terminated. The operations for interpolating an arc are illustrated in FIG. 34.

Output signals at the output terminal 127X of the gate control circuit of FIG. 31 are the TX signals, as shown in curve A of FIG. 5. Output signals provided at the output terminal 127Z of the gate control circuit of FIG. 31 are the signals TZ, as shown in curve B of FIG. 5.

Figure 35:
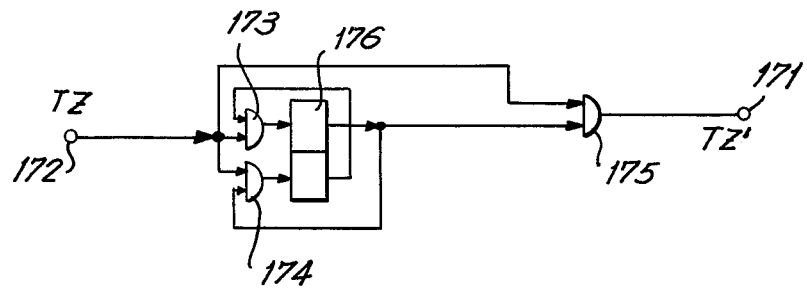
FIG. 35 is a block diagram of a divider which may be utilized in the pulse distribution system of the present invention.
Figure 36:
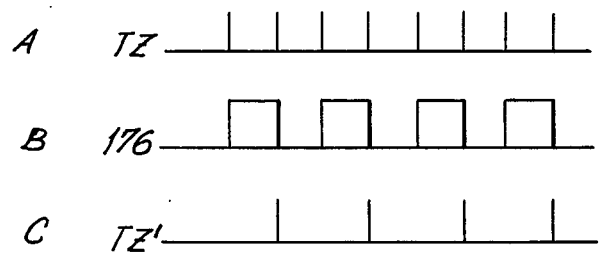
FIG. 36 is a graphical presentation of the waveforms of signals appearing at various points of the divider of FIG. 35.

A pulse dividing circuit which may be utilized as the pulse divider 27 of the system of FIG. 2, is shown in FIG. 35. In FIG. 35, the pulses TZ provided by the interpolator 14 (FIG. 2) are reduced by half. The pulse divider of FIG. 35 thus provides, at an output terminal 171, a single pulse for each two pulses supplied to an input terminal 172. The pulse divider comprises three AND gates 173, 174 and 175 and a flip flop 176. If a pulse TZ is supplied to the input terminal 172 when the flip flop 176 is reset, such pulse sets said flip flop via the AND gate 173. When the next pulse TZ is supplied to the input terminal 172, an output pulse is transferred by the AND gate 175 to the output terminal 171 and the flip flop 176 is reset via the AND gate 174. The circuit is then in its initial condition. The relationship of the pulses TZ supplied to the input terminal 172 of FIG. 35 and the output pulses TZ' provided at the output terminal 171 of said FIG. are shown in curves A and C of FIG. 36. Curve B of FIG. 36 illustrates the operation of the flip flop 176 of FIG. 35.

Figure 37:
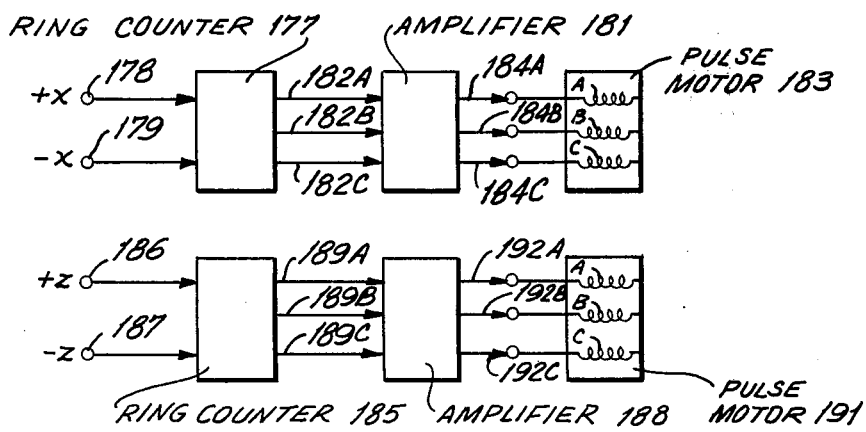
FIG. 37 is a block diagram of an embodiment of pulse motor drive circuits which may be utilized in the pulse distribution system of the present invention.

FIG. 37 shows pulse motor drive circuits which may be utilized as the first servo drive 18 and the second servo drive 19, respectively, of FIG. 2. In FIG. 37, for example, the X axis drive circuit 18 (FIG. 2) comprises a ring counter 177. Input signals indicating the positive and negative X coordinates are supplied to the inputs of the ring counter 177 via input terminals 178 and 179, respectively. The outputs of the ring counter 177 are connected to the input of an amplifier 181. The ring counter 177 produces voltage signals at its output terminals, and therefore in leads 182A, 182B and 182C, in the order A, B, C, A, B, C, and so on each time a pulse is supplied to the input terminal 178. These signals are amplified by the amplifier 181 and are supplied to the windings A, B and C of a pulse motor 183. The pulse motor 183 moves the component 25 (FIG. 2) in directions of the X coordinate. The signals supplied from the amplifier 181 to the pulse motor 183 via leads 184A, 184B and 184C, energize the corresponding windings of said motor in sequence. When pulses are supplied to the input terminal 179 of FIG. 37, the output voltage signals provided by the ring counter 177 are in the order A, C, B, A, C, B, and so on.

The Z axis drive circuit 19 (FIG. 2) comprises a ring counter 185. Input signals indicating the positive and negative Z coordinates are supplied to the inputs of the ring counter 185 via input terminals 186 and 187, respectively. The outputs of the ring counter 185 are connected to the input of an amplifier 188. The ring counter 185 produces voltage signals at its output terminals, and therefore in leads 189A, 189B and 189C in the order A, B, C, A, B, C, and so on each time a pulse is supplied to the input terminal 186. These signals are amplified by the amplifier 188 and are supplied to the windings A, B and C of a pulse motor 191. The pulse motor 191 moves the component 25 (FIG. 2) in directions of the Z coordinate. The signals supplied from the amplifier 188 to the pulse motor 191 via leads 192A, 192B and 192C energize the corresponding windings of said motor in sequence. When pulses are supplied to the input terminal 187 of FIG. 37, the output voltage signals provided by the ring counter 185 are in the order A, C, B, A, C, B, and so on.

FIG. 38 shows an electric pulse motor which may be utilized as each of the first servo or motor 21 and the second servo or motor 23 of the pulse distribution system of FIG. 2. The stator windings A, B, C are energized in sequence. When the stator winding A is energized, the rotor 193 is in the position indicated in FIG. 38, relative to the stator 194. When the stator winding A is deenergized and the stator winding B is energized, the rotor 193 is rotated by one step or increment; that is, until the pole of said rotor moves to a position opposite that of the pole of the stator bearing the winding B. The rotor 193 of the motor is thus rotated a single increment or step for each pulse supplied to the input terminal 178 of FIG. 37, when the motor is for X axis movement, and for each pulse supplied to the input terminal 186 of FIG. 37, when the motor is for Z axis movement.

FIG. 39 illustrates an electrohydraulic pulse motor which may be utilized instead of the electric motor of FIG. 38. The electrohydraulic motor of FIG. 39 is a combined electric and hydraulic motor. An electrohydraulic motor, of the type shown in FIG. 39, is utilized in circumstances in which an electric pulse motor is not capable of providing a torque great enough to move the component 25 (FIG. 2).

In FIG. 39, when an electric pulse motor 195 is rotated, through a specific angle, increment or step, hydraulic fluid or oil is transferred by a spool 196, driven by said motor via a shaft 197, from an inlet 198, via ducts 199, to a duct 201. The hydraulic fluid or oil under pressure which is admitted to the duct 201 is supplied via said duct to a cylinder 202 and moves a piston 203 in said cylinder in a direction outward from said cylinder. The cylinder 202 is formed in a cylinder block 204 which is rotatably mounted on a fixed block 205 via a bearing 206. Thus, when the piston 203 is moved in a direction outward from the cylinder 202, it abuts a slant plate 207 and causes the cylinder block 204 to rotate as a reaction. Due to the fact that said cylinder block is coupled to an output shaft 208, rotation of said cylinder block causes rotation of said output shaft.

When the motor 195 is rotated through the next specific angle, due to the supply of the next pulse thereto, the hydraulic fluid or oil is transferred by the spool 196 from the inlet 198 to a duct 209, via the ducts 199, due to further rotation of said spool. The hydraulic fluid or oil under pressure which is admitted to the duct 209, is supplied via said duct to a cylinder 211 and moves a piston 212 in a direction outward from said cylinder. The cylinder 211 is formed in the cylinder block 204. When the piston 212 is moved, it has the same effect as when the piston 203 is moved.

The output shaft 208, which is rotatably mounted in a bearing 213, is coupled to a rotatable sleeve 214. The sleeve 214 extends from or is coupled to the spool 196. Thus, when the output shaft 208 has rotated to the same extent as the spool 196, the duct 201 in the first instance, and the duct 209 in the second instance, is blocked by said spool and the rotation of said output shaft is halted. An output duct 215 is provided in the fixed block 205.

While the invention has been described by means of specific examples and in a specific embodiment, we do not wish to be limited thereto, for obvious modifications will occur to those skilled in the art without departing from the spirit and scope of the invention.

We claim:

1. A numerical control pulse distribution system for moving a component in directions of first and second axes in accordance with first and second numerical data comprising a source of instructions for moving the component in direction of both axes with first and second numerical data indicated by a desired number of pulses; converting means connected to said source for converting the first and second numerical data to third and fourth numerical data indicated by a number of pulses based upon minor resolution; interpolator means coupled to said converting means and having first and second channels corresponding to the first and second axes, respectively, for distributing pulses depending upon the third and fourth numerical data thereon; first feeding means for displacing the component in a direction of the first axis by constant major resolution; second feeding means for displacing the component in a direction of the second axis by minor resolution, the constant minor resolution having a predetermined ratio to the major resolution; a first pulse operated motor included in the first feeding means connected to the first channel of the interpolator means for rotating the first feeding means a predetermined angle per pulse; dividing means coupled between the first channel of the interpolator means and the first pulse operated motor for reconverting the number of pulses distributed on the first channel of the interpolator means to a lesser number of pulses; and a second pulse operated motor included in the second feeding means coupled to the second channel of the interpolator means for moving said component in directions of the second axis in minor resolution.

2. A numerical control pulse distribution system for a control system in which a component coupled to a pair of pulse operated motors is moved in a pattern by said motors, said component being moved in directions of a first coordinate in accordance with pulses supplied to a first of said motors and in directions of a second coordinate in accordance with pulses supplied to the second of said motors, said numerical control pulse distribution system comprising a source of first and second control data indicating the pattern in which said component is to be moved with first and second numerical data indicated by a desired number of pulses; input data converting means coupled to said source of control data for converting said first and second control data into a number of pulses comprising third and fourth numerical data which is a multiple of the number of pulses corresponding to said control data and is based upon minor resolution; storage means connected to said input data converting means for storing the pulses provided by said input data converting means; interpolator means connected to said storage means for interpolating the pulses stored in said storage means and having first and second channels corresponding to the first and second coordinates, respectively, for distributing pulses depending upon the third and fourth numerical data thereon and corresponding to the number of pulses stored in said storage means; first feeding means for displacing the component in a direction of the first axis by major resolution; second feeding means for displacing the component in a direction of the second axis by minor resolution, the minor resoluton having a predetermined ratio to the major resolution; first driving means included in the first feeding means and connected to the first channel of said interpolator means for driving the first of the pair of motors in direction of the first coordinate; second driving means included in the second feeding means and connected to the second channel of said interpolator means for driving the second of the pair of motors in directions of the second coordinate; and pulse dividing means interposed in the connection of one of said first and second driving means and the first channel of said interpolator means for dividing the number of pulses distributed on the first channel of the interpolator means by said multiple thereby supplying a number of distribution pulses to the corresponding one of the motors which corresponds to the control data whereas the multiple of the number of distribution pulses is supplied to the other of the motors.

3. A method of numerical control pulse distribution for moving a component in directions of first and second axes in accordance with first and second numerical data, comprising the steps of providing instructions for moving the component in directions of both axes with first and second numerical data indicated by a desired number of pulses; deriving from the first and second numerical data of the instructions third and fourth numerical data indicated by a number of pulses based upon minor resolution and distributing pulses depending upon the third and fourth numerical data; first moving the component in directions of the first axis in major resolution; dividing the number of pulses distributed to a lesser number of pulses; and secondly moving the component in directions of the second axis in minor resolution, the minor resolution having a predetermined ratio of the major resolution.

4. A method of numerical control pulse distribution for moving a component in directions of first and second axes in accordance with first and second numerical data as claimed in claim 3, wherein the number of derived pulses is a multiple of the numerical data of the instructions, the component is moved in directions of one of the axes in accordance with the number of pulses and the number of pulses is divided by said multiple and the component is moved in directions of the other of the axes in accordance with the number of pulses in the instructions.

* * * * *